United States Patent [19]
Molnar et al.

[11] Patent Number: 6,081,566
[45] Date of Patent: *Jun. 27, 2000

[54] METHOD AND APPARATUS FOR INTERFERENCE REJECTION WITH DIFFERENT BEAMS, POLARIZATIONS, AND PHASE REFERENCES

[75] Inventors: Karl James Molnar; Gregory Edward Bottomley, both of Cary, N.C.; Thomas Östman, Spånga, Sweden

[73] Assignee: Ericsson, Inc., Research Triangle Park, N.C.

[*] Notice: This patent is subject to a terminal disclaimer.

[21] Appl. No.: 08/634,719

[22] Filed: Apr. 19, 1996

Related U.S. Application Data

[63] Continuation-in-part of application No. 08/284,775, Aug. 2, 1994.

[51] Int. Cl.[7] .................................. H04B 7/10; H04L 1/02
[52] U.S. Cl. .......................... 375/347; 455/132; 342/354
[58] Field of Search .................................... 375/262, 265, 375/267, 341, 346, 347, 348, 349, 229, 230, 232, 235, 343, 316, 259; 455/132, 133; 329/304; 342/374, 81, 154, 354, 457, 373

[56] References Cited

U.S. PATENT DOCUMENTS

| | | |
|---|---|---|
| 4,644,562 | 2/1987 | Kavehrad et al. . |
| 4,713,817 | 12/1987 | Wei . |
| 4,992,798 | 2/1991 | Nozue et al. . |
| 5,031,193 | 7/1991 | Atkinson et al. . |
| 5,048,059 | 9/1991 | Dent . |
| 5,155,744 | 10/1992 | Ringelhaan . |
| 5,164,961 | 11/1992 | Gudmundson . |
| 5,191,598 | 3/1993 | Backstrom et al. . |
| 5,319,677 | 6/1994 | Kim . |
| 5,351,274 | 9/1994 | Chennakeshu et al. . |
| 5,461,389 | 10/1995 | Dean ........................................ 342/375 |
| 5,481,572 | 1/1996 | Skold . |
| 5,499,272 | 3/1996 | Bottomley . |
| 5,602,555 | 2/1997 | Searle et al. ............................ 342/374 |
| 5,680,419 | 10/1997 | Bottomley ............................... 375/347 |

FOREIGN PATENT DOCUMENTS

| | | |
|---|---|---|
| 0 425 458A1 | 5/1991 | European Pat. Off. . |
| 54 3328A1 | 11/1992 | European Pat. Off. .......... H04B 7/00 |
| WO96/04738 | 2/1996 | WIPO . |

OTHER PUBLICATIONS

"Bit–Error–Probability for Non–Coherent Orthogonal Signals in Fading with Optimum Combining for Correlated Branch Diversity", C.S. Chang et al., 1994 IEEE Globecom Communications Theory Mini–Conference Record, CAT. No. 94CH34025, pp. 1–7.

Patent Abstract of Japan, vol. 18, No. 305 (E–1559), Jun. 10, 1994, JP 06 061894 A, Mar. 4, 1994.

J. W. Modestino and V. M. Eyuboglu, "Interegrated Multi-element Receiver Structures for Spatially Distributed Interference Channels," IEEE Trans. Info. Theory, vol. 32, pp. 195–219, Mar. 1986.

M. Stojanovic, J. Catipovic, and J.G. Proakis, "Adaptive Multichannel Combining and Equalization for Underwater Acoustic Communications," J. Acoust. Soc. Am., vol. 94, pp. 1621–1631, Sep. 1993.

(List continued on next page.)

*Primary Examiner*—Chi H. Pham
*Assistant Examiner*—Bryan Webster
*Attorney, Agent, or Firm*—Burns, Doane, Swecker & Mathis, L.L.P.

[57] ABSTRACT

A digital radio communication system includes processing to jointly mitigate the deleterious effects of fading, time dispersion and interference using interference rejection and diversity combining. The system employs a selection processor for preliminarily reducing the number of signals for interference rejection and diversity combining based on one or more criterion. The system accommodates signals from dual polarized antennas. In one particular embodiment, the system performs interference rejection and diversity combining by separating a received signal into its in-phase and quadrature components.

48 Claims, 13 Drawing Sheets

OTHER PUBLICATIONS

M. Stojanovic, J. Catipovic, and J.G. Proakis, "Reduced–Complexity Spatial and Temporal Processing of Underwater Acoustic Communication Signals," J. Acoust. Soc. Am., vol. 98, pp. 961–972, Aug. 1995.

P. Vila, F. Pipon, D. Pirez and L. Fety, "MLSE Antenna Diversity Equalization of a Jammed Frequency–Selective Fading Channel,", Proc. EUSIPCO '94, Edinburgh, UK, pp. 1516–1519, Sep. 1994.

P. Jung, B. Steiner and Y. Ma, "Maximum–Likelihood Detector for Coherent Receiver Antenna Diversity,". Frequenz. vol. 48, pp. 94–99, 1994.

"Bit–Error–Probability for Non–Coherent Orthogonal Signals in Fading with Optimum Combining for Correlated Branch Diversity", C.S. Chang et al., 1994 IEEE Globecom Communications Theory Mini–Conference Record, Cat. No. 94CH34025, pp. 1–7.

Patent Abstract of Japan, vol. 18, No. 305 (E–1559), Jun. 10, 1994, JP 06 061894 A, Mar. 4, 1994.

J. H. Winters, "Signal Acquisition And Tracking With Adaptive Arrays In the Digital Mobile Radio System IS–54 With Flat Fading", IEEE Trans. Veh. Technol., vol. 42, pp 377–384, Nov. 1993.

A.P. Clark and S. Hariharan, "Adaptive Channel Estimator For An HF Radio Link", IEEE Trans. Commun., vol. 37, pp. 918–926, Sep. 1989.

G.D'Aria, R. Piermarini and V. Zingarelli, "Fast Adaptive Equalizers For Narrow–Band TDMA Mobile Radio", IEEE Trans. Veh. Technol., vol. 40, pp. 392–404, May 1991.

Forney, "The Viterbi Algorithm", Proc. IEEE, vol. 61, pp. 286–296, Mar. 1973.

J. H. Winters, "Optimum Combining In Digital Mobile Radio With Cochannel Interference", IEEE J. Sel. Areas Commun., vol. SAC–2, pp. 528–539, Jul. 1984.

J. H. Winters, "Optimum Combining In Digital Mobile Radio With Cochannel Interference", Trans. Veh. Technol., vol. VT–33, pp. 144–155, Aug. 1984.

J. H. Winters, "On The Capacity Of Radio Communication Systems With Diversity In A Rayleigh Fading Environment", IEEE J. Sel. Areas Commun., vol. SAC–5, pp. 871–878, Jun. 1987.

J. H. Winters, "Optimum Combining For Indoor Radio Systems With Multiple Users", IEEE Trans. Commun., vol. COM–35, pp. 1222–1230, Nov. 1987.

P. Balaban and J. Salz, "Dual Diversity Combining And Equalization In Digital Cellular Mobile Radio", IEEE Trans. Veh. Technol., vol. 40, pp. 342–354, May 1991.

S.A. Hanna, M. El–Tanany, and S. A. Mahmoud, "An Adaptive Combiner For Co–Channel Interference Reduction In Multi–User Indoor Radio Systems", Proc. IEEE Veh. Technol. Conf., St. Louis, MO, May 19–22, 1991, pp. 222–227.

J. H. Winters, J. Salz, and R. D. Gitlin, "The Capacity Increase Of Wireless Communication Systems With Antenna Diversity", Proc. 1992 Conf. Inform. Sciences Syst., vol. II, Princeton, NJ, Mar. 18–20, 1992, pp. 853–858.

P. Balaban and J. Salz, "Optimum Diversity Combining And Equalization In Digital Data Transmission With Applications To Cellular Mobile Radio—Part I: Theoretical Considerations", IEEE Trans. Commun., vol. 40, pp. 885–894.

J. H. Winters, J. Salz, and R. D. Gitlin, "The Capacity Of Wireless Communication Systems Can Be Substantially Increased By The Use Of Antenna Diversity", 1st Intl. Conf. on Universal Personal Communications (ICUPC '92), Sep. 29–Oct. 2, 1992, Dallas, TX, pp. 02.01.1–02.01.5.

M. V. Clark, L. J. Greenstein, W. K. Kennedy, and M. Shafi, "Optimum Linear Diversity Receivers In Digital Cellular Radio", Proc. Third International Symposium On Personal, Indoor, and Mobile Radio Communications, Boston, MA, Oct. 19–21, 1992.

J. H. Winters, "Signal Acquisition And Tracking With Adaptive Arrays In Wireless Systems", Proc. 43rd IEEE Veh. Technol. Conf., Secaucus, NJ 1993, pp. 85–88.

J. H. Winters, J. Salz, and R. D. Gitlin, "The Impact Of Antenna Diversity On The Capacity Of Wireless Communication Systems", IEEE Trans. Commun., vol. 42, pp. 1740–1751, Feb./Mar./Apr. 1994.

D. W. Tufts and A. A. Shah, "Rapid Interference Suppression And Channel Identification For Digital, Multipath Wireless Channels", Proc. 44th IEEE Veh. Techol. Conf., Stockholm, Sweden, Jun. 7–10, 1994, pp. 1241–1245.

S. Simanapalli, "Adaptive Array Methods For Mobile Communications", Proc. 44th IEEE Veh. Technol. Conf., Stockholm, Sweden, Jun. 7–10, pp. 1503–1506.

W. H. Sheen and G. L. Stuber, "MLSE Equalization And Decoding For Multipath–Fading Channels", IEEE Trans. Commun. vol. 39, No. 10, Oct. 91.

Q. Liu and Y. Wan, "An Adaptive Maximum–Likelihood Sequence Estimation Receiver With Dual Diversity Combining/Selection", Int. Symp. On Personal, Indoor And Mobile Radio Commun., Boston, MA, pp. 245–249, Oct. 19–21, 1992.

Q. Liu and Y. Wan, "A Unified MLSE Detection Technique For TDMA Digital Cellular Radio", 43rd IEEE Vehicular Technology Conference, Secaucus, NJ, pp. 265–268, May 18–20, 1993.

P. Monsen, "Theoretical And Measured Performance Of A DFE Modem On A Fading Multipath Channel", IEEE Trans. Commun., vol. COM–25, pp. 1144–1153, Oct. 1977.

P. Monsen, "Feedback Equalization For Fading Dispersive Channels", IEEE Trans. Info. Theory, vol. IT–17, pp. 56–64, Jan. 1981.

P. Monsen, "MMSE Equalization Of Interference On Fading Diversity Channels", IEEE Trans. Commun. vol. COM–32, No. 1, pp. 5–12, Jan. 1984.

G. Ungerboeck, "Adaptive Maximum–Likelihood Receiver For Carrier–Modulated Data–Transmission Systems", IEEE Trans. Commun., vol. COM–22, pp. 624–635, May 1974.

W. Van Etten, "Maximum Likelihood Receiver For Multiple Channel Transmission Systems", IEEE Trans. Commun., vol. COM–24, pp. 276–283, Feb. 1976.

"Free From Sample Timing And Input Level Controls", Secaucus, NJ, May 18–20, 1993, No. Conf. 43, May 18, 1993, Institute of Electrical and Electronics Engineers, pp. 408–411, XP 000393208, Kazuhiro Okanoue et al.

N. W. K. Lo, D. D. Falconer and A. U. H. Sheikh, "Adaptive Equalization And Diversity Combining For A Mobile Radio Channel", Proc. IEEE Globecom '90, pp. 507A.1.1–507A.2.5, Dec. 1990.

N. W. K. Lo, D. D. Falconer and A. U. H. Sheikh, "Adaptive Equalization And Diversity Combining For Mobile Radio Using Interpolated Channel Estimates", IEEE Trans. Veh. Technol., vol. 40, pp. 636–645, Aug. 1991.

R. D. Koilpillai, S. Chennakeshu, and R. L. Toy, "Equalizer Performance With Diversity For U.S. Digital Cellular", Intl. Symp. on Personal, Indoor and Mobile Radio Commun., Boston, MA, pp. 255–259, Oct. 19–21, 1992.

B. Picinbono, "On Circularity", IEEE Trans. Sig. Proc., vol. 42, pp. 3473–3482, Dec. 1994.

G. E. Bottomley and K. Jamal, "Adaptive Arrays And MLSE Equalization", Proc. VTC '95, Chicago, IL, Jul. 1995, pp. 50–54.

Young C. Yoon and Harry Leib, "Matched Filtering In Improper Complex Noise And Application To DS–CDMA", IEEE publication No. 0-7803-3002-1/95, 1995, pp. 701–705.

W. Lee and Y. Yeu, "Polarization Diversity System For Mobile Radio", IEEE Transactions on Communications, COM–20(5), pp. 912–923, Oct. 1972.

S. Kozono, T. Tsuruhara, and M. Sakamotot, "Base Station Polarization Diversity Reception For Mobile Radio", IEEE Transactions on Vehicular Technology, 33(4), pp. 301–306, 1978.

A. Baier, G. Heinrich, and U. Wellens, "Bit Synchronization And Timing Sensitivity In Adaptive Viterbi Equalizers For Narrowband–TDMA Digital Mobile Radio Systems", Proc. VTC '88, Philadelphia, PA, pp. 377–384, 1988.

M. V. Clark, L. J. Greenstein, W. K. Kennedy, and M. Shafi, "Optimum Linear Diversity Receivers For Mobile Communications", IEEE Trans. Veh. Technol., vol. 43, pp. 47–56, Feb. 1994.

J. Salz and J. H. Winters, "Effect Of Fading Correlation On Adaptive Arrays in Digital Mobile Radio", IEEE Trans. Veh. Technol., vol. 43, pp. 1049–1057, Nov. 1994.

J. W. Modestino and V. M. Eyuboglu, "Integrated Multielement Receiver Structures For Spatially Distributed Interference Channels", IEEE Trans. On Info. Theory, vol. IT–32, pp. 195–219, Mar. 1986.

METHOD AND APPARATUS FOR INTERFERENCE REJECTION WITH DIFFERENT BEAMS, POLARIZATIONS, AND PHASE REFERENCES

RELATED APPLICATION

This application is a continuation-in-part of U.S. patent application Ser. No. 08/284,775 entitled Method of and Apparatus for Interference Rejection Combining in Multi-Antenna Digital Cellular Communications Systems by Gregory Edward Bottomley, filed on Aug. 2, 1994, the disclosure of which is expressly incorporated here by reference.

BACKGROUND

The present invention pertains to processing of radio communication signals to offset the effects of multipath fading, time dispersion and channel interference. The invention more specifically pertains to performing the above identified signal processing using signals derived from a variety of different antenna designs, or using signals separated into in-phase and quadrature components.

In a practical radio communication system, there commonly co-exists a number of phenomena which degrade the quality of transmitted signals. Among the most troublesome phenomena are flat fading, time dispersion, and channel interference.

Flat fading and time dispersion are multipath effects caused by the interference of a main transmitted signal and its reflections or echos (which may be caused by the surrounding terrain). When the path lengths are relatively small, the multiple signals will arrive at the receiver at almost the same time. The signals add either constructively or destructively, giving rise to flat fading having a Rayleigh distribution. When the path lengths are relatively large, the transmission medium is considered time dispersive, and the added signals can be viewed as echoes of the transmitted signal. The echoes are delayed with respect to the main ray. Time dispersion gives rise to intersymbol interference (ISI).

Channel interference arises due to the presence of sources which are not orthogonal to the desired signal. Non-orthogonal signals, or interference, often come from radios operating on the same frequency (i.e. co-channel interference) or from radios operating on neighboring frequency bands (i.e. adjacent-channel interference). Non-orthogonal signal sources are referred to as interferers.

Fading can be mitigated by having multiple receive antennas and employing some form of diversity combining, such as selective combining, equal gain combining, or maximal ratio combining. Diversity takes advantage of the fact that the fading on the different antennas is not the same, so that when one antenna has a faded signal, chances are the other antenna does not. Note Mobile Communications Design Fundamentals by William C. Y. Lee, Howard W. Sams & Co., Ind., U.S.A. In section 3.5.1 of this book, several examples are given describing how signals from two receiver amplifiers with separate antennas can be combined to counteract fading.

Time dispersion may be advantageously corrected by using an equalizer. In the case of digital signal modulation, a maximum likelihood sequence estimation (MLSE) equalizer such as described in Digital Communications, 2nd Ed., by John G. Proakis, Mc-Graw Hill Book Company, New York, N.Y., U.S.A., 1989 may be used. In section 6.7 of this book, various methods are described for detecting signals corrupted by time dispersion, or inter-symbol interference (ISI), using MLSE equalization.

The impact of channel interference may be reduced by employing array processing techniques with multiple antennas. For example, adaptive beamforming can be used to "steer" a null in the antenna pattern in the direction of an interferer.

More recently, methods have been proposed that partially solve the problems of multipath fading and interference. In U.S. Pat. No. 5,191,598 to Bäckström, et al., for example, the problem of accurately detecting signals in the presence of flat fading and time dispersion is overcome by using a Viterbi-algorithm having a transmission function estimated for each antenna. By reference thereto, U.S. Pat. No. 5,191, 598 is incorporated herein in its entirety. Another method of accurately detecting signals in the presence of flat fading and interference was presented in the IEEE Transactions on Vehicular Technology, Vol. 42, No. 4, Nov. 1993, J. H. Winters: "Signal Acquisition and Tracking with Adaptive Arrays in the Digital Mobile Radio System IS-54 with Flat Fading".

Although the above described techniques greatly improve signal quality, there remains room for improvement. Including separate processing modules to separately address fading, time dispersion and interference adds to the cost and complexity to the device.

Furthermore, algorithms (such as Viterbi's) can not cost-effectively handle a large number of diversity branches. It would be desirable to provide some way of culling out a smaller number of diversity branches prior to performing interference rejection and diversity combining to reduce the computational complexity and hardware requirements of the receiver.

Finally, the above-described techniques fail to provide a receiver design which could be easily adapted to a variety of antenna configurations, such as phased array antennas or antennas producing signals having different polarizations. It would be desirable to provide a technique for reducing the deleterious effects of signal transmission which would accommodate a wide variety of antenna configurations. There is further need to reduce deleterious effects of signal transmission in the situation where the in-phase and quadrature components of the interference are correlated.

SUMMARY

Accordingly, it is one exemplary object of the invention to perform interference rejection combining to jointly offset the effects of flat fading, time dispersion and channel interference.

It is a further exemplary object of the present invention to perform interference rejection combining in a manner which accommodates different antenna designs, such as antennas producing signals having different polarizations.

It is a further exemplary object of the present invention to perform interference rejection combining for radiocommunication signals separated into in-phase and quadrature components.

The present invention achieves the above objectives, as well as additional objectives, according to exemplary embodiments of the present invention, by employing a method and apparatus for generating and transmitting a signal representing a transmitted symbol sequence and receiving the signal on at least two separate antennas. The signal is processed to produce received signal samples for each of the antennas. Channel taps are estimated for each of the antennas. Impairment correlation properties between antennas are also estimated. Branch metrics are formed in a branch metric processor using the received signal samples and the channel tap and impairment correlation estimates. The branch metrics are employed in a sequence estimation algorithm to estimate the transmitted symbol sequence.

In one exemplary embodiment, branch metrics are formed by generating hypothetical symbol sequences and filtering the hypothetical signal sequences with the channel tap estimates to produce hypothesized received signal samples for each antenna. The hypothesized received signal samples are subtracted from the received signal samples to produce hypothesized error signals which are processed with the estimate of impairment correlation properties to produce branch metrics.

In another exemplary embodiment, an estimate of impairment correlation properties is formed by generating tentative detected symbol sequences which are filtered with the channel tap estimates to produce detected signal samples for each antenna. The detected signal samples are subtracted from the received signal samples to produce detected error signals which are processed with the estimate of impairment correlation properties to produce an update of the estimate of the impairment correlation properties.

According to another particularly beneficial embodiment of the present invention, the above described method and apparatus can be used in conjunction with a variety of different antenna designs and configurations. This embodiment employs a selection processor which selects N output signals from M input signals received from an antenna or beamforming processor (where $M \geq N$). The selection processor chooses the N signals (out of M) that meet one or more criteria. For instance, the selection processor may choose a set of N signals having acceptable instantaneous branch power, acceptable average branch power, acceptable beam center direction relative to desired signal direction, and/or acceptable signal quality as gauged from a sync word.

According to one exemplary embodiment, the selection processor interfaces with M co-phased antenna elements which may be a combination of both horizontally and vertically polarized antenna elements. The signals received by the M co-phased antenna elements are fed to a fixed beamforming processing, and thereafter sent to the selection processor. Alternatively, the signals from the M co-phased antenna elements are fed to two fixed beamforming processors. One of the two fixed beamforming processors processes the vertically polarized signals, while the other processes the horizontally polarized signals. Instead of vertical and horizontal polarization, other types of orthogonal polarization may be used.

According to another exemplary embodiment, the selection processor interfaces with sector antennas, where the antennas may be either vertically or horizontally polarized. In this embodiment, antennas with the same polarization can be physically separated. Again, instead of vertical and horizontal polarization, other types of orthogonal polarization may be used.

In yet another particularly beneficial embodiment of the present invention, the input radio signal is separated into its in-phase and quadrature components. The in-phase and quadrature components are processed as if they were received from separate antenna elements.

According to this embodiment, the invention includes a method and apparatus for receiving a radio signal on at least one antenna element representing a transmitted symbol sequence. This radio signal is processed to produce received signal samples for the at least one antenna. A channel tap is estimated for the at least one antenna, as are scalar correlation properties. A branch metric is formed using a scalar branch metric processor on the basis of the received signal samples, the channel tap estimate, and the scalar estimate of impairment correlation properties. The scalar branch metric is, in turn, used in a sequence estimation algorithm to estimate the transmitted symbol sequence.

According to another embodiment of the invention, branch matrices are formed by generating hypothetical symbol sequences. These hypothetical signal sequences are filtered with the channel tap estimate to produce hypothesized received signal samples for the at least one antenna. The hypothesized received signal samples are subtracted from the received signal samples to produce complex error signals. These complex error signals are processed with the scalar estimate of impairment correlation properties to produce branch metrics. More particularly, this last step involves extracting an in-phase phase component from the complex error signal, and extracting a quadrature component of the complex error signal, and performing processing on the in-phase component and the quadrature component to produce the branch metrics.

According to another embodiment of the invention, the impairment correlation properties are estimating by first generating tentative detected symbol sequences. These tentative detected symbol sequences are filtered with the scalar channel tap estimate to produce estimated received signal samples for the at least one antenna. The estimated received signal samples are subtracting from the received signal samples to produce impairment signal samples. These impairment signal samples are processed with the estimate of scalar impairment correlation properties to produce an updated estimate of said scalar impairment correlation properties. More specifically, this last step includes extracting an in-phase phase component from the impairment signal samples, and extracting a quadrature component of the impairment signal samples, and performing processing on these components.

According to still another exemplary embodiment of the present invention, a plurality of branch metric processors are employed, each of which processes a different group of signals. More specifically, this embodiment entails receiving a number of M radio signals representing a transmitted symbol sequence and selecting therefrom groups of radio signals using a selection processor. The groups of radio signals are processed to produce branch metrics. These branch metrics are added together to produce combined branch metrics. The combined branch metrics is then employed in conjunction with a sequence estimation algorithm to estimate the transmitted symbol sequence.

BRIEF DESCRIPTION OF THE DRAWINGS

These and other features and advantages of the present invention will be readily apparent to one skilled in the art from the following written description when read in conjunction with the drawings in which like reference numerals refer to like elements.

DETAILED DESCRIPTION

In the following description, for purposes of explanation and not limitation, specific details are set forth, such as particular circuits, circuit components, techniques, etc. in order to provide a thorough understanding of the invention. However it will be apparent to one skilled in the art that the present invention may be practiced in other embodiments that depart from these specific details. In other instances, detailed descriptions of well-known methods, devices, and circuits are omitted so as not to obscure the description of the present invention with unnecessary detail.

A. Description of Embodiment having Two Antennas and a Branch Metric Processor

Figure 1:
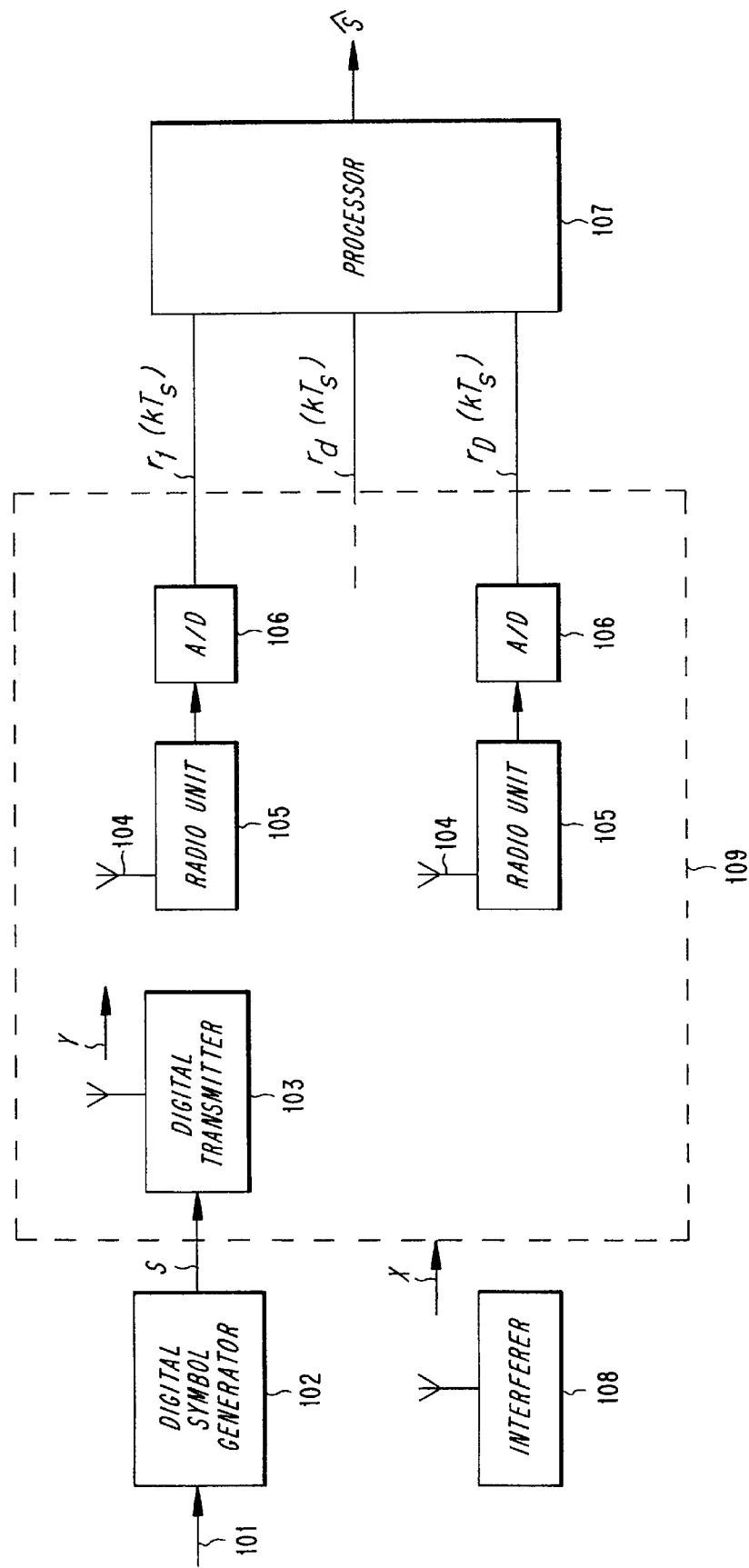
FIG. 1 is an exemplary illustration of a digital radio communication system.

A radio transmitter and receiver system for a radio communication system is illustrated schematically in FIG. 1. The radio communication system may operate using frequency division multiple access (FDMA), time division multiple access (TDMA), or code division multiple access (CDMA), or some combination thereof. A transmitter has a digital symbol generator 102 which receives an information carrying signal 101 and generates a corresponding digital symbol sequence, S. The symbol sequence S is subjected to digital to analog (D/A) conversion, modulation, pulse shape filtering, amplification, and is transmitted as analog signal Y by digital transmitter 103 according to known techniques.

In addition to thermal noise, there may also exist an interferer 108 transmitting signal X which may be non-orthogonal to signal Y. Signals Y and X travel through separate radio channels and are intercepted by antennas 104 which are D in number.

Radio units 105 amplify, downconvert, and filter the received signals according to known methods to produce analog signals. Each analog signal is coupled to an analog-to-digital (A/D) converter 106, which converts the analog signal into a received signal sample stream $r_d(kT_s)$, where $T_s$ is the sample period, the reference numeral k is an integer counter, and the subscript d indicates that the signal arrives from the $d^{th}$ antenna $1 \leq d \leq D$. The sampling period $T_s$ may be less than the symbol period T. The received signal sample streams are collected in processor 107, which processes these streams to produce an estimate of the transmitted digital symbol stream, Ŝ. In later descriptions, transmission function 109 is used to refer to the signal path through digital transmitter 103, the radio transmission channel (not shown in FIG. 1), antennas 104, radio units 105 and A/Ds 106 collectively.

Figure 2:
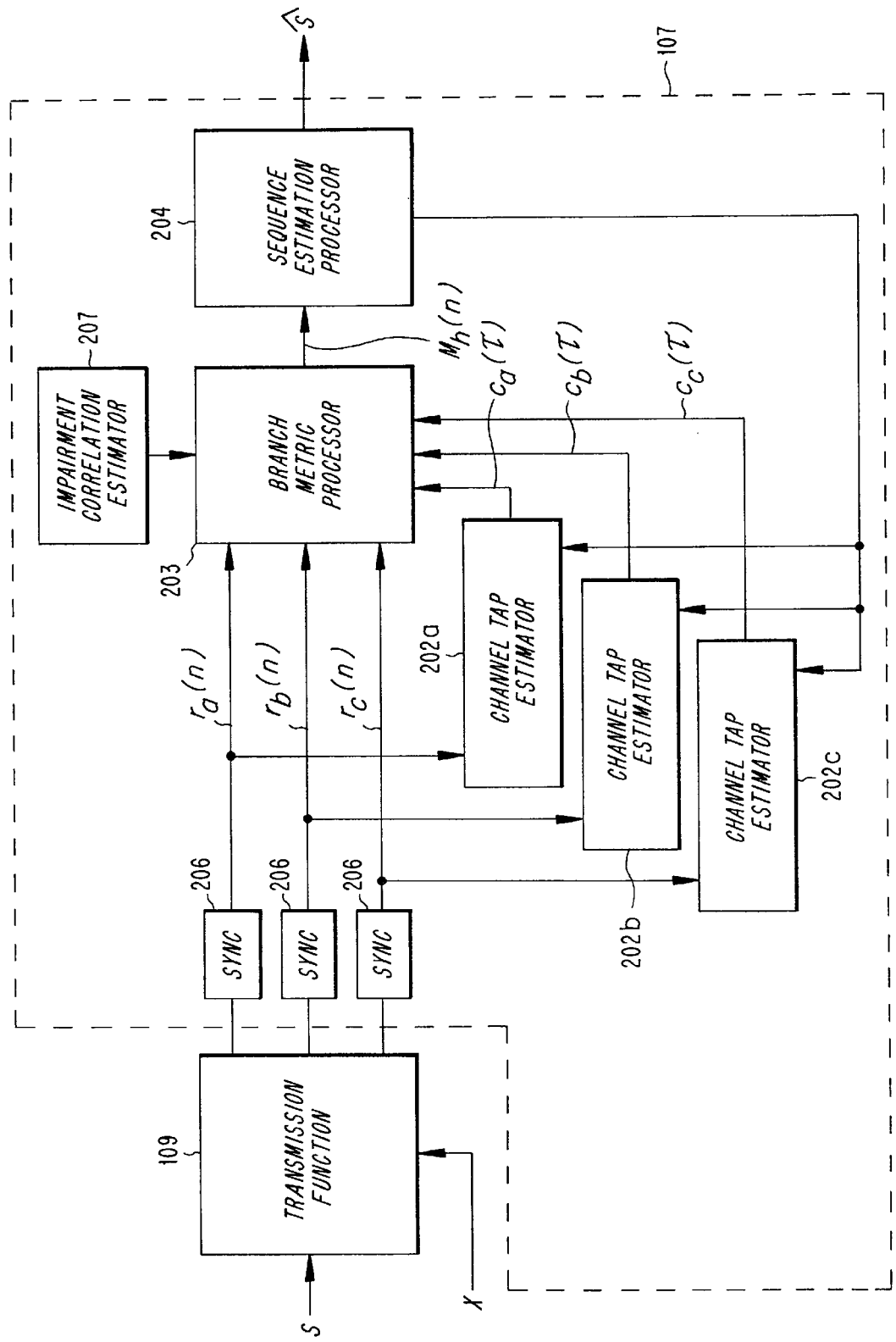
FIG. 2 is an exemplary illustration of a receiver processor and transmission function according to the present invention using a vector branch metric processor.

The processing unit 107 is illustrated in greater detail in FIG. 2 where, for simplicity, the number D of antennas is restricted to three: designated a, b, and c. Processing unit 107 may be, for example, a Digital Signal Processor (DSP) such as a TMS320C50 manufactured by Texas Instruments. The function of processing unit 107 is to produce an estimate of the transmitted digital symbol stream Ŝ which accurately corresponds to the symbol sequence S which was originally transmitted.

Transmission function 109 produces the received signal sample streams $r_a(kT_s)$, $r_b(kT_s)$, and $r_c(kT_s)$ which are sent to processing unit 107 where they are processed in accordance with the present invention. The received signal sample streams $r_a(kT_s)$, $r_b(kT_s)$, and $r_c(kT_s)$ are coupled to a signal pre-processor, or sync, block 206 where the received signal sample streams are correlated with known timing/synchronization sequences as described, for example, by Giovanna, et al. "Fast Adaptive Equalizers for Narrow-Band TDMA Mobile Radio", IEEE Transactions on Vehicular Technology, Vol. 40, No. 2, May 1991, pp. 392–404. For the case of symbol-spaced demodulation, if the sample period $T_s$ is less than symbol period, T, the signal pre-processor 206 performs a decimation of the received signal sample streams $r_a(kT_s)$, $r_b(kT_s)$, and $r_c(kT_s)$ to produce one sample per symbol: designated $r_a(n)$, $r_b(n)$, and $r_c(n)$ respectively. For the case of fractionally-spaced demodulation, more than one sample per symbol is generated.

Estimating circuits 202a, 202c, and 202c produce channel tap estimates $c_a(\tau)$, $c_b(\tau)$, and $c_c(\tau)$ which are used to model the radio transmission channel associated with each particular antenna. Initial channel tap estimates can be obtained from sync correlation values or least-squares estimation according to known techniques. If the channel must be tracked, it is typical to use received data and tentative symbol estimate values generated in the sequence estimation processor 204. Channel tracking is known to those skilled in the art as discussed, for example, in Digital Communications 2nd Ed. by Proakis as previously mentioned, and by A. P. Clark and S. Hariharan, "Adaptive Channels Estimates for an HF Radio Link", IEEE Trans. on Communications, vol. 37, pp. 918–926, September, 1989. The channel tap estimates $c_a(\tau)$, $c_b(\tau)$, and $c_c(\tau)$ are coupled to the input of the branch metric processor 203.

Also coupled to the branch metric processor 203 is an estimate of the impairment correlation properties obtained from impairment correlation estimator 207. The estimate of the impairment correlation properties comprises information regarding the impairment correlation properties between the receive antennas 104. The impairment correlation estimator uses impairment process estimates to update and possibly track the estimate of the impairment correlation properties which is discussed in further detail in the ensuing text and figures.

Branch metric processor 203 uses received signal samples $r_a(n)$, $r_b(n)$, and $r_c(n)$, channel tap estimates $c_a(\tau)$, $c_b(\tau)$, and $c_c(\tau)$, and the estimate of the impairment correlation properties to form branch metric $M_h(n)$. This branch metric is used, for example, in a sequence estimation processor 204 to develop tentative and final estimates of the transmitted symbols.

Figure 3:
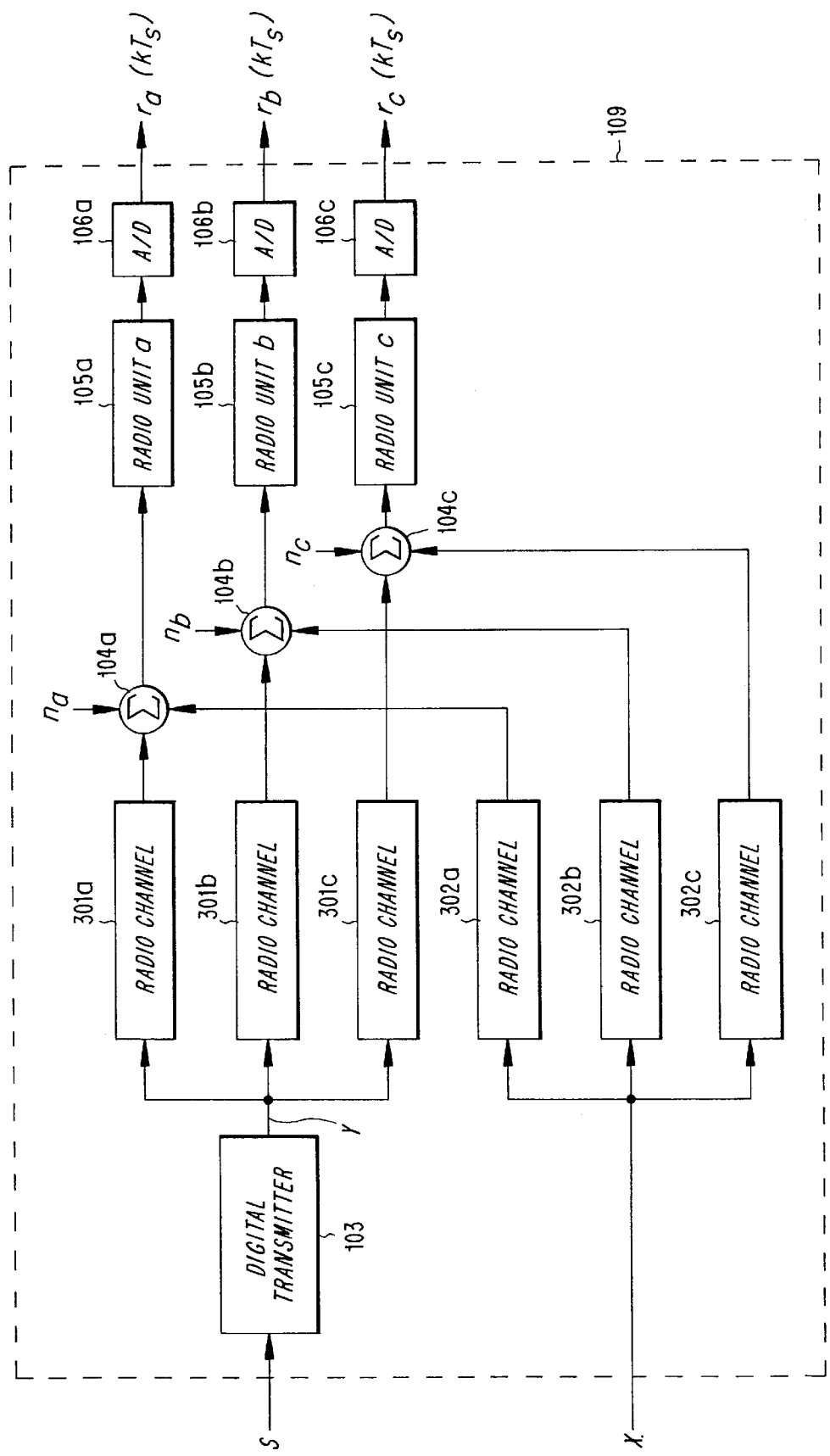
FIG. 3 is an exemplary illustration of a transmission function.

The transmission function 109 is illustrated in greater detail in FIG. 3 where, for simplicity, the number of interferers is restricted to one. It will be apparent to one skilled in the art that the present invention may also be used for the case where there are two or more interferers. The transmit function 109 begins with the signal path for the symbol sequence S through digital transmitter 103 which transmits analog signal Y. The analog signal Y propagates through a separate radio transmission channel to each of the three receiver antennas: radio channel 301a to receiver antenna 104a, radio channel 301b to receiver antenna 104b, and radio channel 301c to receiver antenna 104c. Similarly, interference signal X also propagates through three other separate radio channels 302a–302c to receiver antennas 104a–104c respectively. Radio channels 301a–301c and 302a–302c may introduce fading and time dispersion. Omnipresent thermal noise processes $n_a$–$n_c$ are also received by receiver antennas 104a–104c respectively. Each antenna 104a–104c is coupled to a radio unit 105a–105c respectively which amplifies, downconverts, and filters the received signals according to known methods to produce an analog signal. Each analog signal is coupled to an analog-to-digital (A/D) converter 106a–106c which converts the analog signals into received signal sample streams $r_a(kT_s)$, $r_b(kT_s)$, and $r_c(kT_s)$. One method for conversion from analog to digital is to use log-polar signal processing, as described in U.S. Pat. No. 5,048,059 to Dent, the disclosure of which is incorporated by reference herein in its entirety. For subsequent processing, a conversion from log-polar to rectangular samples is made, so that, for example, I and Q samples, sometimes referred to as complex samples, are used. By using log-polar signal processing initially, a limiting receiver which provides signal strength and phase samples can be used, and adaptive gain control can be made simple.

In an MLSE equalizer, different possible transmitted symbol sequences S are considered. In one implementation, hypothesized symbol values $s_h(n)$ are filtered by channel tap estimates $c_a(\tau)$, $c_b(\tau)$, and $c_c(\tau)$ to produce hypothesized received samples $r_{a,h}(n)$, $r_{b,h}(n)$, and $r_{c,h}(n)$ for each antenna. The differences between the hypothesized $r_{a,h}(n)$–$r_{c,h}(n)$ and the actual $r_a(n)$–$r_c(n)$ received signal sample streams, referred to as the hypothesis errors, give an indication of how good a particular hypothesis is. The squared magnitude of the hypothesis error is used as a metric to evaluate a particular hypothesis. The metric is accumulated for different hypotheses for use in determining which hypotheses are better using the sequence estimation algorithm. This process may be efficiently realized using the Viterbi algorithm, which is a known form of dynamic programming. A description of the Viterbi algorithm may be found in Forney, G., "The Viterbi Algorithm", Proc. of the IEEE, vol. 61, pp. 268–278, March, 1973. As will be apparent to one skilled in the art, other sequence estimation algorithms, such as the M-algorithm, may also be used.

In an MLSE equalizer, there are states associated with different symbol sequence hypotheses $s_h(n)$. At a given iteration, there are previous states: each associated with an accumulated metric. Each pairing of a previous state with a current state results in a branch metric, $M_h(n)$. The candidate metric for a current state is then the sum of the branch metric $M_h(n)$ and the previously accumulated metric. For each current state, the previous state which gives the smallest candidate metric is selected as the predecessor state, and the smallest candidate metric becomes the accumulated metric for the current state. For metric combining, as described in aforementioned U.S. Pat. No. 5,191,598, the branch metric can be expressed as:

where:

$$M_h(n) = [r(n) - Cs_h(n)]^H D[r(n) - Cs_h(n)]$$

$$r(n) = [r_a(n) r_b(n) r_c(n)]$$

$$C = \begin{bmatrix} C_a(0) & \ldots & C_a(N_t - 1) \\ C_b(0) & \ldots & C_b(N_t - 1) \\ C_c(0) & \ldots & C_c(N_t - 1) \end{bmatrix}$$

$$s_h(n) = [s_h(n) s_h(n-1) \ldots ]^T$$

$$D = \begin{bmatrix} K_a & 0 & 0 \\ 0 & K_b & 0 \\ 0 & 0 & K_c \end{bmatrix}$$

The channel tap estimates for each signal received on antenna 104a–104c are designated by $c_a(\tau)$, $c_b(\tau)$, $c_c(\tau)$ respectively where $\tau$ is delay (i.e. $\tau=0$ is the main ray, $\tau=1$ is the first echo, etc.). $N_t$ is the number of channel taps estimated per antenna and $K_a$, $K_b$, $K_c$ are weighting coefficients for antennas 104a–104c respectively.

The present invention takes advantage of the fact that, from a diversity and equalization point-of-view, the impairment (interference+noise) on multiple receive antennas 104 is often correlated at any specific moment in time, even though, on the average, it may be uncorrelated. By expanding diversity combining techniques to exploit this correlation, significant gains are realized. For optimal performance, a whitening, or decorrelation, process may be applied and the optimum branch metric may include the inverse of the impairment correlation matrix. The optimum branch metric $M_h(n)$ according to the present invention is:

$$M_h(n) = [r(n) - C(n)s_h(n)]^H A(n)[r(n) - C(n)s_h(n)] = e_h^H(n) A(n) e_h(n)$$

where:

$$A(n) = R_{zz}(n)^{-1},$$

or a related quantity;

$$R_{zz}(n) = E(z(n) z^H(n))$$

$$z(n) = [z_a(n) z_b(n) z_c(n)]^T;$$

$$e_h(n) = r(n) - C(n) s_h(n)$$

The time varying nature of the channel and the impairment correlation are denoted with time index n. The $R_{zz}(n)$ matrix is referred to as the impairment correlation matrix at discrete time, n. The A(n) matrix (i.e., the A-matrix) is the inverse of the $R_{zz}(n)$ matrix, or a related quantity such as the adjoint or pseudo-inverse. As will be apparent to those skilled in the art, $R_{zz}(n)$ and A(n) are specific examples of impairment correlation properties of which other forms are known. Throughout the following, the term A-matrix is used generically to refer to any estimate of the impairment correlation properties.

The impairments on antennas 104a–104c at time n are designated by $z_a(n)$, $z_b(n)$, and $z_c(n)$ respectively. For a given hypothesis, $e_h(n)$ is an estimate of the impairment process. As shown above, the A-matrix, A(n), is the inverse of the impairment correlation matrix $R_{zz}(n)$. For the case of uncorrelated impairment (i.e., no interferer) the A-matrix reduces to diagonal matrix D. When the signal is known or detected correctly, the impairment is given by:

$$z(n) = r(n) - C(n) s_{det}(n)$$

where:

$$s_{det}(n) = [s_{det}(n) s_{det}(n-1) \ldots]^T$$

Note that $s_{det}(n)$ is the known or detected symbol sequence at time n.

Determination of the A-matrix for use in the present invention can be performed in a number of ways depending upon the specific application and the required performance. The simplest approach is to use a fixed set of values for the A-matrix, stored in memory. These values depend primarily on the configuration of the receive antennas and on the carrier frequencies being employed. An alternative approach is to determine the A-matrix from synchronization information and to keep the A-matrix values constant between synchronization, or other, known fields. At each new occurrence of the synchronization field, the A-matrix can be recomputed, with or without use of the previous A-matrix values. Another alternative approach is to use synchronization fields to initialize, or improve, the A-matrix values and then to use decisions made on the data field symbols to track the A-matrix values.

Also, consideration is given for the method used to track the A-matrix values. Since the A-matrix comprises information regarding the impairment correlation properties between the antennas 104a, 104b, and 104c, standard estimation methods for estimating correlation or inverse correlation matrices can be applied. Using either known or detected symbol values, impairment values can be obtained by taking the differences between the received signal sample streams $r_a(n) - r_c(n)$ and the hypothesized received signal sample streams $r_{a,h}(n) - r_{c,h}(n)$. At time n, this gives a vector of impairment values, denoted z(n); one value for each antenna. Here, elements in the vector correspond to different antennas 104. A straightforward way of forming the A-matrix is given by:

$$R(n) = \lambda R(n-1) + K z(n) z^H(n)$$

$$A(n) = R^{-1}(n)$$

K is a scaling constant, typically 1 or $\sqrt{(1-\lambda)}$. Because R(n) is a Hermitian matrix, only a portion of the matrix elements need be computed.

Such a straightforward approach is fairly high in complexity. One way to reduce complexity is to apply the matrix inversion lemma and update the A-matrix directly as:

$$A(n) = \frac{1}{\lambda}\left[A(n-1) - \left(\frac{1}{\lambda + z(n)^H p(n)}\right) p(n) p^H(n)\right]$$

where:

$$p(n) = A(n-1) z(n)$$

Because the A-matrix is Hermitian, it is only necessary to compute those elements on the diagonal and either those elements above or below the diagonal.

These techniques for estimating and tracking the A-matrix are given only for purposes of illustration. In general, the A-matrix can be expressed and estimated in a variety of ways, as will be apparent to those skilled in the art. See, for example, the book by S. Haykin, Adaptive Filter Theory, Second Edition, Prentice-Hall, Englewood Cliffs, N.J., 1991. The present invention may also be applied to the blind equalization problem in which known synchronization sequences are absent. In this case, the A-matrix is estimated in a manner similar to how the channel is estimated.

In a first embodiment, a processor 107 having a symbol-spaced (i.e., T-spaced) equalizer is presented where the channel must be tracked over the data field, or burst. This embodiment is applicable to the digital cellular system defined by the IS-136 specification which has relatively long TDMA data bursts (6.67 milliseconds) with respect to time. For this embodiment, the branch metric processor 203 is illustrated in greater detail in FIG. 4 where, for simplicity, the number of antennas is further restricted to two: designated a and b. This particular embodiment has usefulness in that the use of two receive antennas is common in many cellular systems which already employ some form of diversity combining. As before, it will be apparent to those skilled in the art that this embodiment may also be employed in the case where there are three or more antennas.

The impairment correlation matrix $R_{zz}$ and the inverse impairment correlation matrix A are defined as follows:

$$R_{zz} = P = \begin{bmatrix} p_{aa} & p_{ab} \\ p_{ab}^* & p_{bb} \end{bmatrix}$$

$$R_{zz}^{-1} = \frac{1}{(p_{aa} p_{bb} - |p_{ab}|^2)} \begin{bmatrix} p_{bb} & -p_{ab} \\ -p_{ab}^* & p_{aa} \end{bmatrix} = w \begin{bmatrix} p_{bb} & -p_{ab} \\ -p_{ab}^* & p_{aa} \end{bmatrix} = A$$

The variable $P_{aa}$ denotes the impairment power received on antenna a; the variable $p_{bb}$ denotes the impairment power received on antenna b. The off-diagonal matrix elements are the cross correlation values: $p_{ab}$ denotes the correlation of the impairment received on antenna a with the conjugate of that received on antenna b.

The branch metric then becomes:

$$M_h(n) = e_h(n)^H A(n) e_h(n) = w[p_{bb}|e_{a,h}(n)|^2 - 2\text{Re}\{p_{ab} e_{a,h}(n)^* e_{b,h}(n)\} + p_{aa}|e_{b,h}(n)|^2]$$

where:

$$w = \frac{1}{p_{aa} p_{bb} - |p_{ab}|^2}$$

and $$e_{d,h}(n) = r_d(n) - r_{d,h}(n)$$

Figure 4:
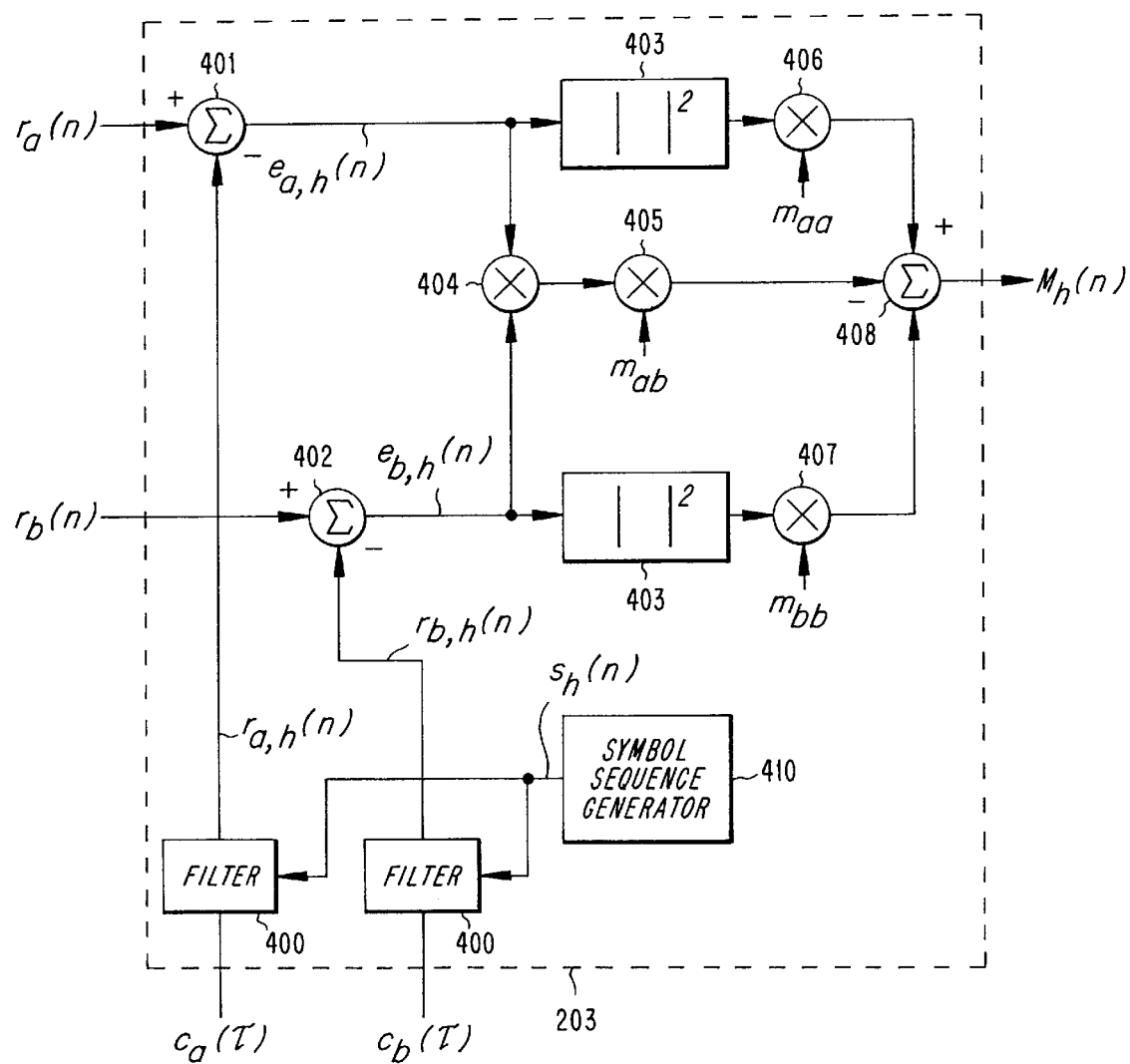
FIG. 4 is an exemplary illustration of a vector metric processor according to the present invention.

The calculation of this branch metric is schematically illustrated in FIG. 4.

A symbol sequence generator 410 generates hypothesized symbol sequences $s_h(n)$. These sequences are filtered in filters 400 using channel tap estimates $C_a(\tau)$ and $c_b(\tau)$ for antennas a and b to produce hypothesized received signal samples $r_{a,h}(n)$ and $r_{b,h}(n)$, respectively. The hypothesized received signal samples, $r_{a,h}(n)$, are subtracted from the actual received signal samples from antenna a, $r_a(n)$, in summing junction 401 to produce error signal $e_{a,h}(n)$. Similarly hypothesized received signal samples, $r_{b,h}(n)$, are subtracted from the actual received signal samples from antenna b, $r_b(n)$, in summing junction 402 to produce error signal $e_{b,h}(n)$. Blocks 403 form the squared magnitudes of the error signals $e_{a,h}(n)$ and $e_{b,h}(n)$. The squared magnitude for error signal $e_{a,h}(n)$ is multiplied at junction 406 by multiplier $m_{aa}$, the result being coupled to summing junction 408. The squared magnitude for error signal $e_{b,h}(n)$ is multiplied at junction 407 by multiplier $m_{bb}$, the result being coupled to summing junction 408. Finally, multiplier 404 forms the product of $e_{a,h}(n)$ and $e^*_{b,h}(n)$, the product of which is subsequently multiplied by multiplier $m_{ab}$ in multiplier 405, forming the real part only. The result is subtracted in summing junction 408, the output of which is the branch metric $M_h(n)$. The multipliers $m_{aa}$, $m_{bb}$, and $m_{ab}$ are related to the impairment correlation matrix by:

$$m_{aa} = w p_{bb}$$

$$m_{bb} = w p_{aa}$$

$$m_{ab} = 2 w p_{ab}$$

As will be apparent to those skilled in the art the w term is common to the branch metric calculation and may be applied in a different manner or even omitted when the denominator to w approaches zero.

At time n, the A matrix elements are updated as:

$$p_{aa}(n+1) = \lambda p_{aa}(n) + |e_a(n)|^2 K$$

$$p_{ab}(n+1) = \lambda p_{ab}(n) + e_a(n) e_b^*(n) K$$

$$p_{bb}(n+1) = \lambda p_{bb}(n) + |e_b(n)|^2 K$$

K is a scaling factor which, if equal to unity, is dropped from the calculation to reduce the number of computations. K may be derived from $\lambda$ which is the so-called "forgetting factor".

Figure 5:
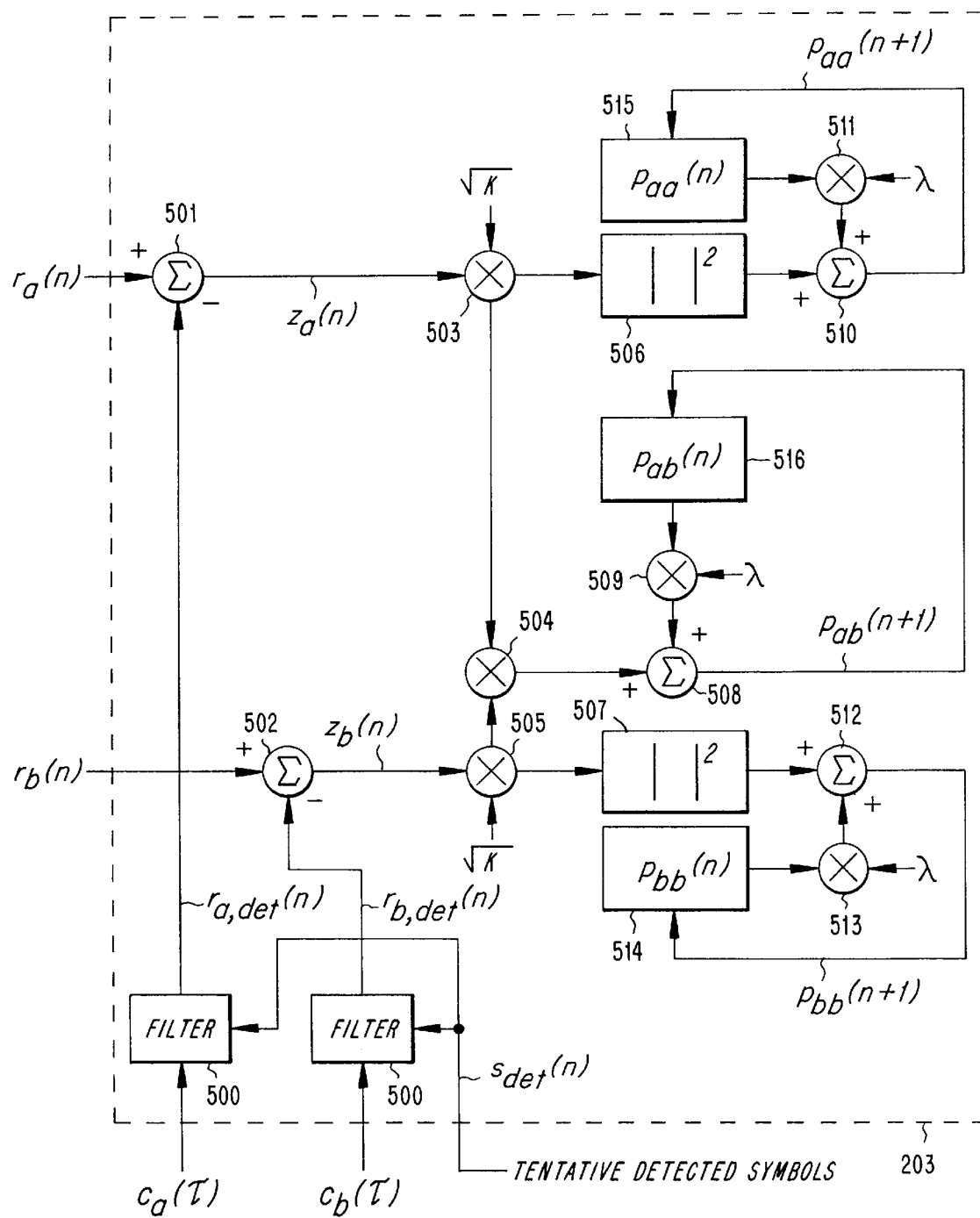
FIG. 5 is an exemplary illustration of a vector adaptive estimator of the impairment correlation properties.

A schematic illustration of the impairment correlation matrix update is shown in FIG. 5. Tentative detected symbol values $s_{det}(n)$ from sequence estimation processor 204 are filtered in filters 500 using channel tap estimates $c_a(\tau)$ and $c_b(\tau)$ from channel tap estimators 202 for antennas a and b to produce expected received samples $r_{a,det}(n)$ and $r_{b,det}(n)$, respectively. Impairment signal $z_a(n)$ is produced by subtracting, in summing junction 501 $r_{a,det}(n)$ from the actual received signal samples from antenna a, $r_a(n)$. Similarly, impairment signal $z_b(n)$ is produced by subtracting, in summing junction 502 $r_{b,det}(n)$ from the actual received signal samples on antenna b, $r_b(n)$. If the tentative detected symbol values are correct and the channel tap estimates are accurate, then error signals $z_a(n)$ and $z_b(n)$ represent the impairment received on antennas a and b respectively. Impairment signals $z_a(n)$ and $z_b(n)$ are scaled by the root of the scaling factor K in multipliers 503 and 505 respectively to produce scaled impairment signals which are coupled to blocks 506 and 507, respectively.

The impairment power received on antenna a, $p_{aa}(n)$, is multiplied in multiplier 511 by the forgetting factor, $\lambda$, and summed in junction 510 with the squared magnitude of the scaled impairment signal from block 506 to produce the updated impairment power $p_{aa}(n+1)$. The value of $p_{aa}(n+1)$ is then used to overwrite the memory location 515 of the previous impairment power $p_{aa}(n)$. Similarly, the previous impairment power received on antenna b, $p_{bb}(n)$, is multiplied in multiplier 513 by the forgetting factor, $\lambda$, and summed in junction 512 with the squared magnitude of the scaled error signal from block 507 to produce the updated impairment power $p_{bb}(n+1)$ which is used to overwrite the memory location 514 of the previous impairment power $p_{bb}(n)$. To produce the updated impairment cross correlation, the scaled error signal from multiplier 503 is multiplied with the conjugate of the scaled error signal from multiplier 505 in junction 504. Also, the previous cross-correlation $p_{ab}(n)$, stored in memory 516, is scaled by the forgetting factor in multiplier 509. The output of junction 504 is summed in junction 508 with the output of multiplier 509 to yield the updated cross correlation $p_{ab}(n+1)$. As before, the updated value $p_{ab}(n+1)$ is used to overwrite the memory location 516 of the previous value $p_{ab}(n)$.

There is typically a delay in updating the channel tap estimates which allows the tentative detected symbols to become reliable. In U.S. Pat. No. 5,164,961 by Gudmundson, et al., incorporated herein by reference in its entirety, this delay is avoided by using multiple channel models: one for each state in the sequence estimation processor 204. With the present invention, there is also a delay in updating the A-matrix quantities. It will be apparent to those skilled in the art that this delay can be avoided by using multiple A-matrices; one for each state in the sequence estimation processor 204.

B. Description of Embodiment Employing a Selection Processor

According to the following embodiment the present invention, interference rejection is applied to signals that correspond to N different antenna elements, wherein the N antenna elements are selected from a number $M \geq N$ possible antenna signals. Additionally, these selected antenna element signals may have passed through a specific beamforming process and/or the signals may come from antennas that have different polarizations. As a specific exemplary embodiment, three different cases of multi-element receive antennas are considered which employ the use of horizontal and vertical polarizations. However, other types of orthogonal polarizations may be used, such as plus and minus 45 degrees, or right and left circular.

Returning to FIG. 1, consider the specific case where there are M antenna elements 104 producing radio signals. Not all M signals will contain information relevant to the transmitted signal. Further, it is desirable to reduce the number of diversity branches sent to the processor 107. Accordingly, it is beneficial to select a set of N signals most representative of a transmitted symbol sequence.

Figure 6:
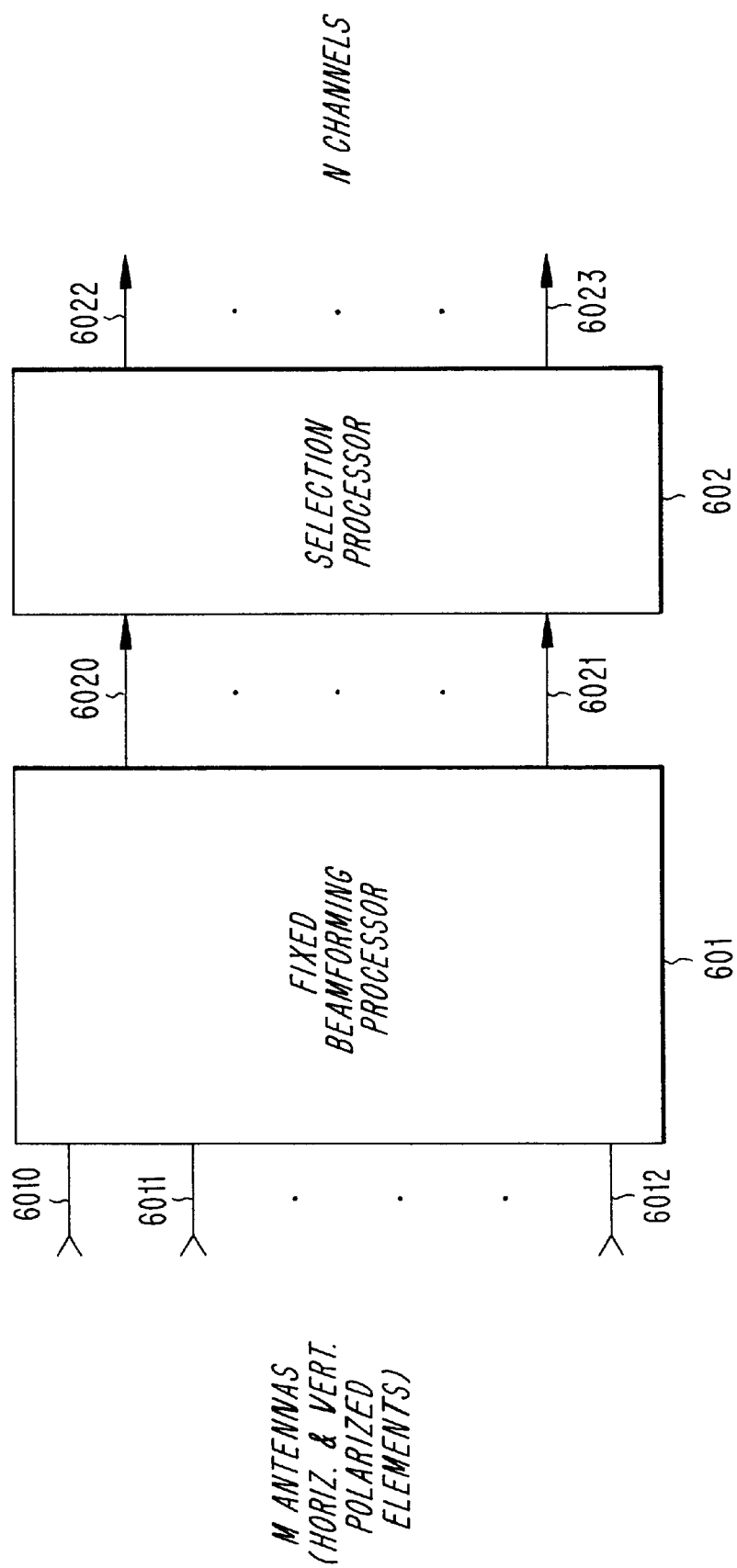
FIG. 6 is an exemplary illustration of an embodiment consisting of vertical and horizontal antenna elements with a single fixed beamforming processor.

The N channels processed by the processor 107 and generated by the M antennas/antenna elements are described in FIGS. 6 through 9. FIG. 6 shows the first embodiment where M co-phased antenna elements (which may be a combination of both horizontally and vertically polarized elements) given by signals 6010 through 6012 are first passed through a fixed beamforming processor 601 that results in M beamspace signals 6020 through 6021. The antenna elements in this embodiment typically are spaced closely (e.g. a half of a wavelength) together. The selection processor 602 chooses N beamspace signals 6022 through 6023 for further IRC processing.

Figure 7:
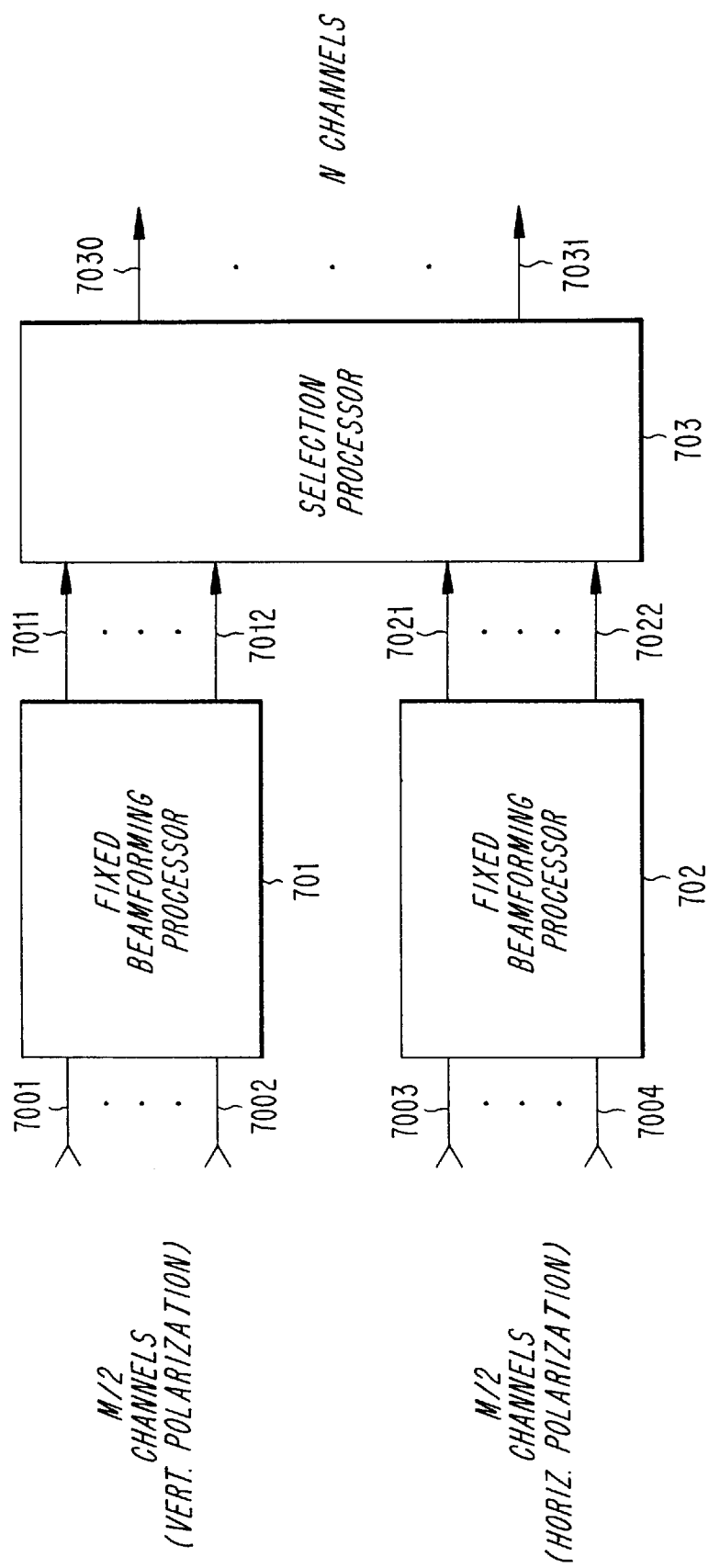
FIG. 7 is an exemplary illustration of an embodiment consisting of vertical and horizontal antenna elements with separate fixed beamforming processors for the vertical and horizontal elements.

FIG. 7 is an embodiment where M co-phased antenna element signals 7001 through 7004 are passed through two beamforming processors 701 and 702, one each for the vertically and horizontally polarized elements. Signals 7001 through 7002 correspond to the vertical antenna elements and are processed by 701 giving outputs 7011 through 7012, while signals 7003 through 7004 correspond to the horizontal antenna elements and are processed by 702 giving outputs 7021 through 7022. Signals 7011 through 7012 and 7021 through 7022 are processed by the selection processor 703 and N output signals 7030 through 7031 are selected.

Figure 8:
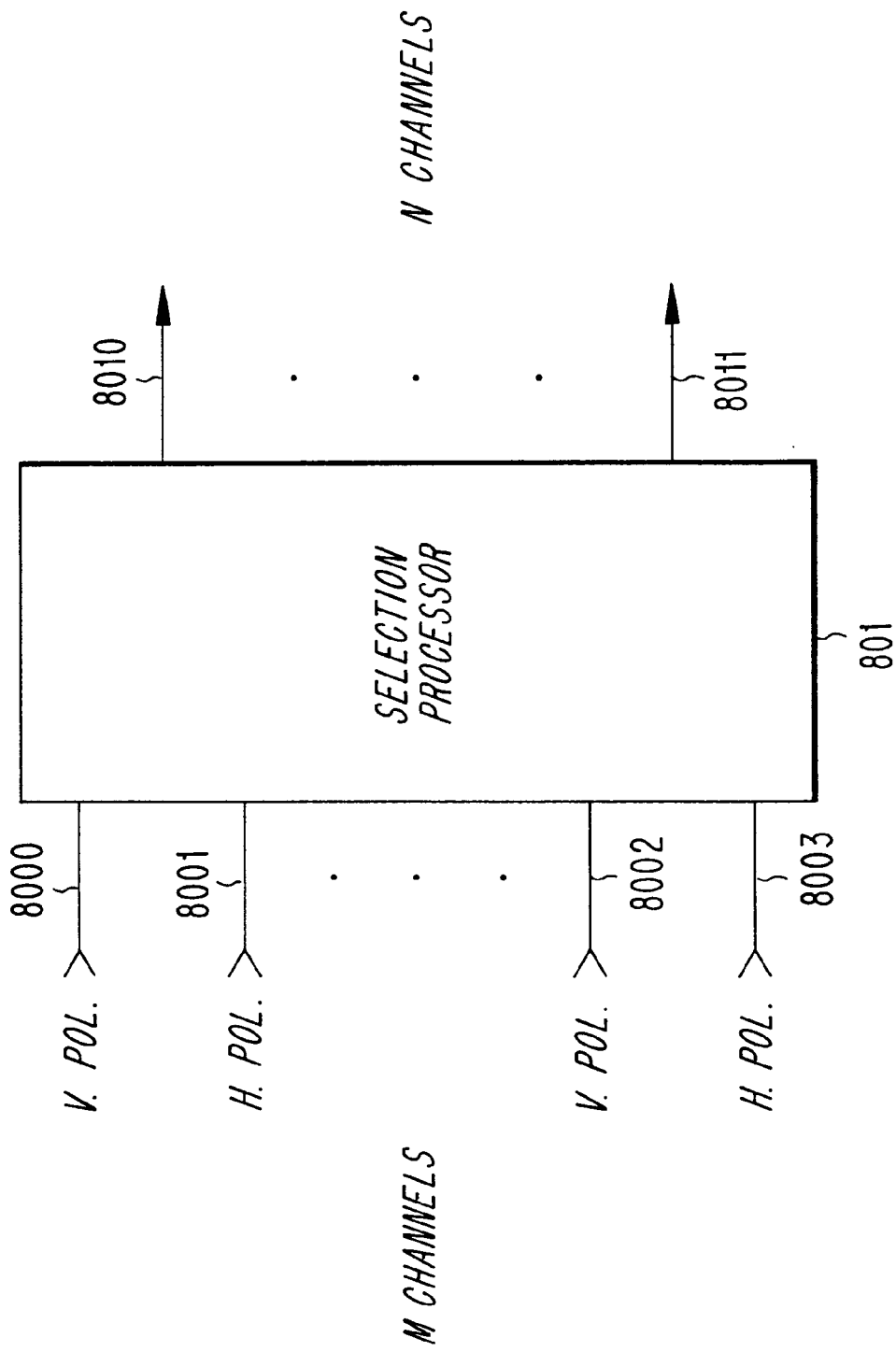
FIG. 8 is an exemplary illustration of an embodiment consisting of vertical and horizontal antennas with no fixed beamforming processor.

FIG. 8 is an embodiment that uses sector antennas, where the antennas may be either vertically or horizontally polarized. The antenna signals are 8000 through 8003 and are processed by the selection processor 801 to generate N output signals 8010 through 8011. In this embodiment, antennas with the same polarization may be physically separated (e.g. 10–20 wavelengths).

To reiterate, the embodiments shown in FIGS. 6–8 are not restricted to the use of horizontal and vertical polarizations. As noted, other types of orthogonal polarizations may be used, such as plus and minus 45 degrees, or right and left circular. Furthermore, in the embodiment disclosed in FIG. 7, more than two beam processors may be employed. For instance, different beam processors may be assigned to process groups of signals originating from different spatially separated groups of antenna elements.

Figure 9:
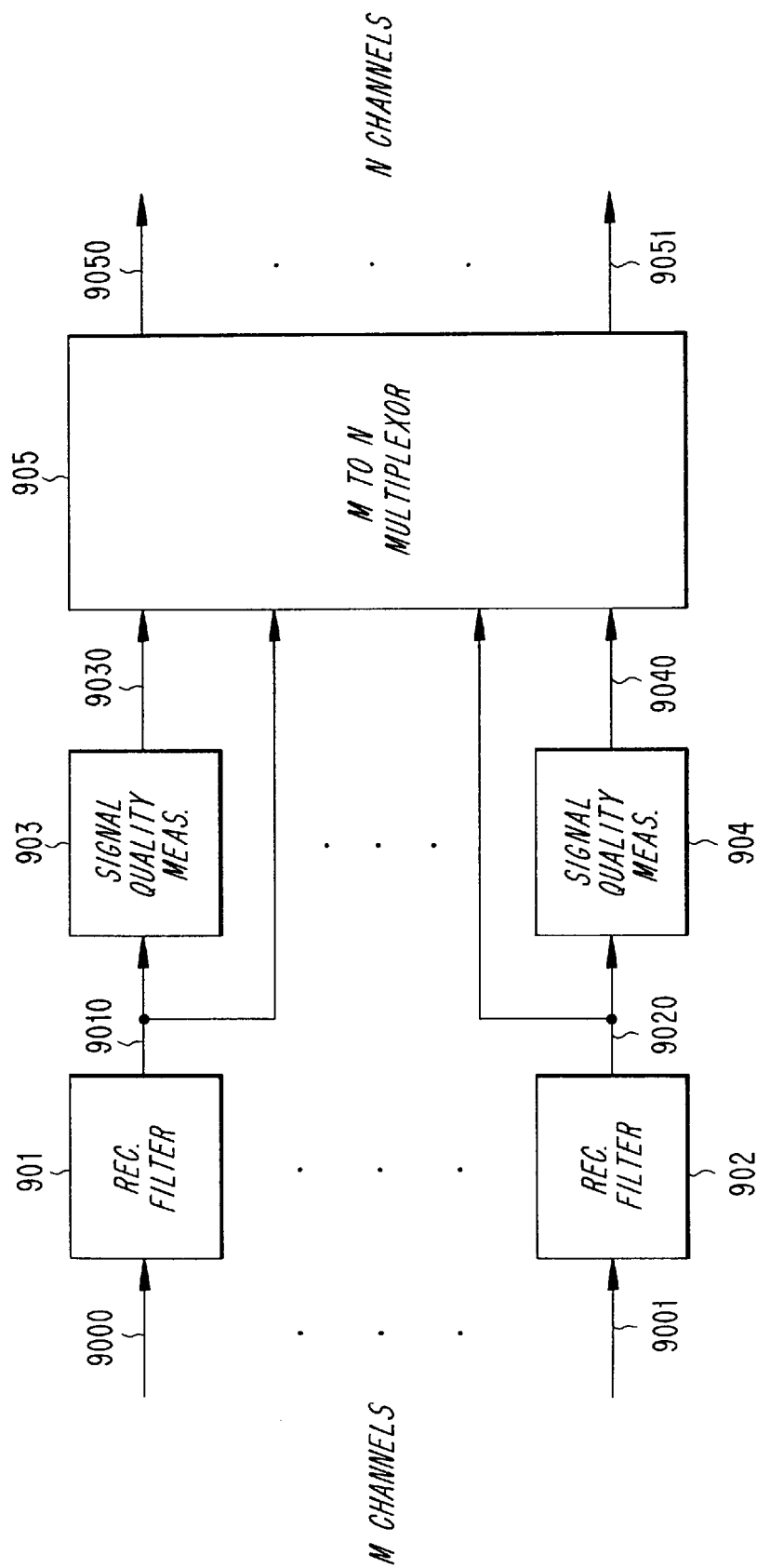
FIG. 9 is an exemplary illustration of an embodiment of the branch selection processor that chooses N antenna signals from M (N≦M) possible signals based upon some signal quality measure.

FIG. 9 shows an embodiment of the branch selection processor. Each input signal branch 9000 through 9001 is first filtered by 901 through 902 and then passed through some signal quality measure device 903 through 904 which generates measures 9030 through 9040 that is used to compare the signal's quality relative to the other signals. The M signals 9010 through 9020 are sent to the selection multiplexor 905, which chooses the N signals (out of M) that have the best measure 9030 through 9040. The measure criteria may be defined to represent one or more of the following qualities: measured instantaneous branch power; measured average branch power; beam center direction relative to desired signal direction; signal quality as measured from sync word (measured (S+N)/N). "S" denotes signal power, whereas "N" denotes impairment power.

Furthermore, the selection may be constrained to keeping at least one vertically polarized and one horizontally polarized signal. For example, choosing the horizontal beam with the maximum power and the vertical beam with the maximum power performs best in certain circumstances (such as the presence of Rayleigh fading). Again, other types of orthogonal signals may be used.

Still a further embodiment may dispense with the selection processor altogether. In this case, the processor 107 is fed all of the M signals received from the antenna elements. This embodiment may employ antenna elements producing orthogonally polarized signals and/or one or more fixed beam processors as discussed above.

C. Description of Embodiment having One Antenna and a Scalar Branch Metric Processor In an alternative embodiment of the present invention, interference rejection is applied to signals that correspond to different phase references. Normally, the in-phase (I) and quadrature (Q) components of the baseband signal are combined into one complex signal. However, when the interference is not rotationally invariant, then the two components must be treated as separate, scalar received signals. See, for example, B. Picinbono, "On circularity", IEEE Trans. Sig. Proc., Vol. 42, pp. 3473–3482, December, 1994.

As a specific embodiment, the case of a single receive antenna is considered, though it will be apparent to those skilled in the art how multiple receive antennas, beams, or polarizations would be incorporated. With a single receive antenna, complex receive samples r(n) are split into in-phase samples I(n) and quadrature samples Q(n). These two sample streams are treated as if they came from two, scalar channels. The new branch metric is then $$M_h(n) = v_h^T(n) A(n) v_h(n)$$

where $$v_h(n) = [v_{h,I}(n) v_{h,Q}(n)]^T = [Re\{e_h(n)\} Im\{e_h(n)\}]^T$$

$$e_h(n) = r(n) - c(n) s_h(n)$$

$$c(n) = [c(0;n) c(1;n) \ldots c(N_t-1;n)]$$

$$s_h(n) = [s_h(n) s_h(n-1) \ldots s_h(n-N_t+1)]^T$$

$$A(n) = R_{ww}^{-1}(n)$$

$$R_{ww}(n) = E\{w(n) w^T(n)\}$$

$$w(n) = [Re\{z(n)\} Im\{z(n)\}]^T$$

and z(n) is the complex, additive impairment. Superscript "T" denotes transpose. The vector w(n) is the corresponding scalar impairment vector. The channel tap estimates are denoted c(τ), and there are $N_t$ of them. The real matrices A(n) and $R_{ww}^{-1}$(n) are specific examples of scalar impairment correlation properties of which other forms are known. Throughout the following, the term A-matrix is used generically to refer to any estimate of the impairment correlation properties.

The A-matrix can be estimated and tracked in a variety of ways. One way is to form impairment samples z(n) by subtracting expected received samples from the actual received samples. Scalar impairment vector w(n) is then given by the equation given above. A straightforward way of forming the A-matrix is given by:

$$R_{ww}(n) = \lambda R_{ww}(n-1) + w(n) w^T(n)$$

$$A(n) = R_{ww}^{-1}(n)$$

To reduce complexity, the matrix inversion lemma may be used so that the A-matrix can be updated directly as $$A(n) = \frac{1}{\lambda} \left[ A(n-1) - \frac{p(n) p^T(n)}{\lambda + w^T(n) p(n)} \right]$$

Because the A-matrix is symmetric, only the elements on the diagonal and above need be computed.

For the case of one receive channel, the branch metric can be expressed:

$$M_h(n) = m_{II}(v_{h,I}(n))^2 + m_{QQ}(v_{h,Q}(n))^2 + m_{IQ} v_{h,I}(n) v_{h,Q}(n)$$

Also, the impairment correlations can be estimated using:

$$p_{II}(n+1) = \lambda p_{II}(n) + v_I^2(n)$$

$$p_{QQ}(n+1) = \lambda p_{QQ}(n) + v_Q^2(n)$$

$$p_{IQ}(n+1) = \lambda p_{IQ}(n) + v_I(n) v_Q(n)$$

where $v_I(n)$ and $v_Q(n)$ are the real and imaginary parts of an impairment sample estimate.

With these estimates, the combining weights can be computed as:

$$m_{II} = K p_{II}(n)$$

$$m_{QQ} = K p_{QQ}(n)$$

$$m_{IQ} = -2K p_{IQ}(n)$$

Ideally, the scaling factor K would be given by:

$$K = \frac{1}{p_{II}(n) p_{QQ}(n) - p_{IQ}^2(n)}$$

However, other values are possible, including unity, so that no scaling is necessary.

Figure 10:
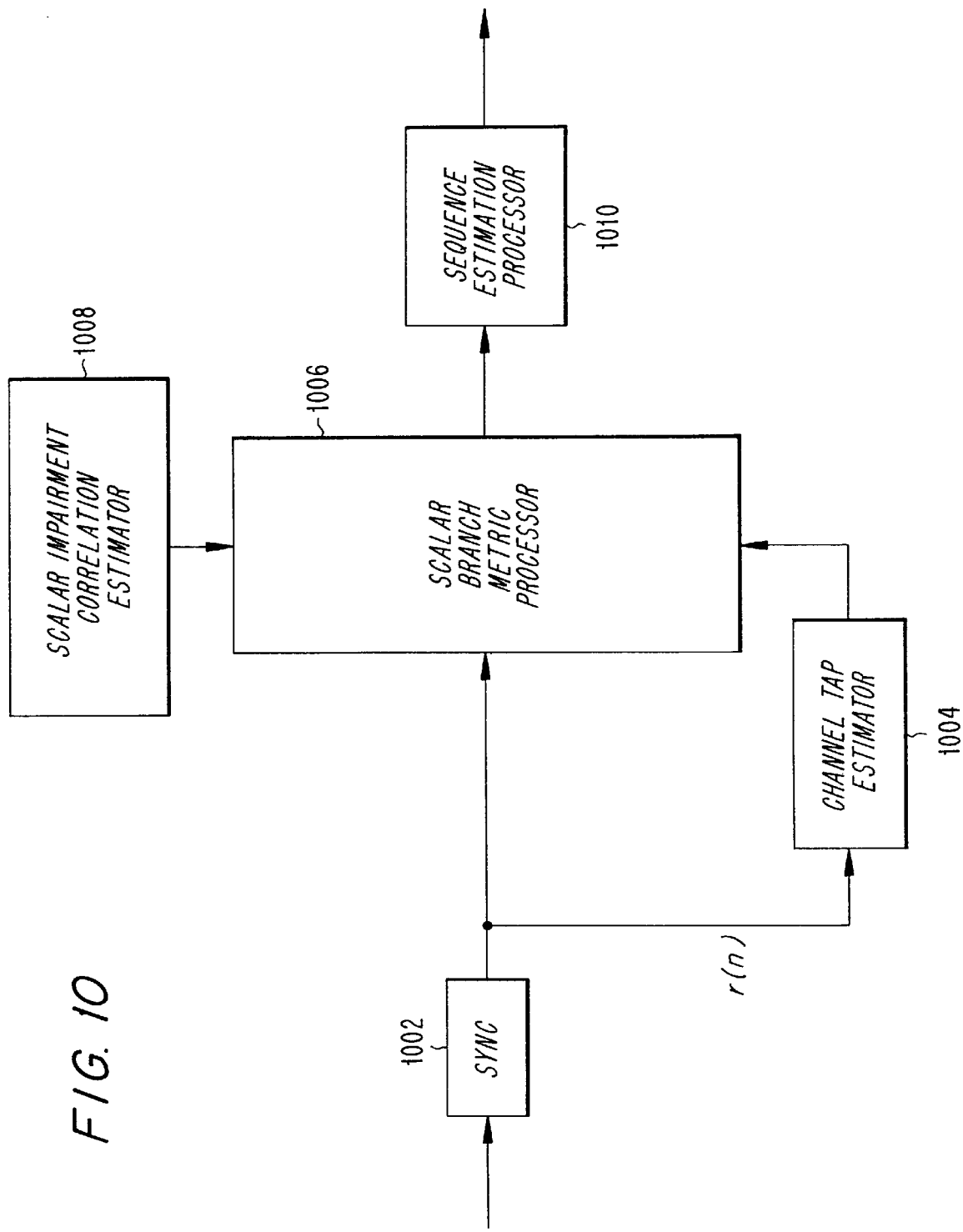
FIG. 10 is an exemplary illustration of a receiver processor and transmission function according to the present invention using a scalar branch metric processor.

The alternative embodiment is illustrated by the processor given in FIG. 10. After radio processing and initial analog-to-digital conversion (not shown), the received signal is coupled to a signal pre-processor or sync, block 1002, where timing and synchronization information are determined, producing synchronized complex received samples r(n). Channel tap estimator 1004 produces channel tap estimates C(τ) which model the fading, dispersive channel. These channel tap estimates are coupled to scalar branch metric processor 1006.

Also coupled to scalar branch metric processor 1006 is an estimate of the scalar impairment correlation properties obtained from impairment correlation estimator 1008. The estimate of the impairment correlation properties includes information regarding the impairment correlation properties between the I and Q components of the received signal, which are scalar quantities.

Scalar branch metric processor 1006 uses the received signal samples r(n), channel tap estimates c(τ), and an estimate of the impairment correlation properties to form branch metric $M_h(n)$. This branch metric is used in sequence estimation processor 1010 to develop tentative and final estimates of the transmitted symbols.

Figure 11:
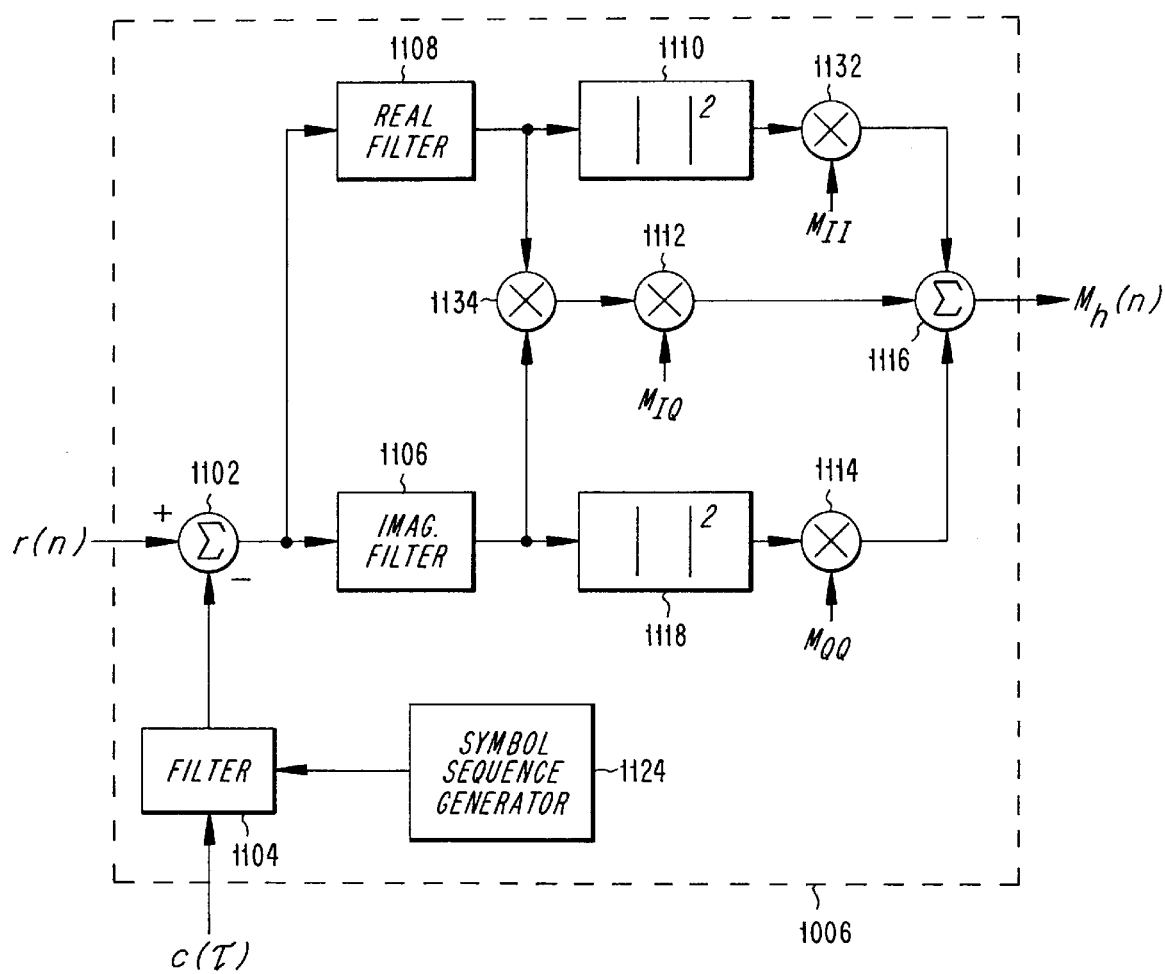
FIG. 11 is an exemplary illustration a scalar branch metric processor according to the present invention.

A specific embodiment of the scalar branch metric processor 1006 is illustrated in FIG. 11. A symbol sequence generator 1124 generates hypothesized symbol sequences $s_h(n)$. These sequences are filtered by filter 1104 using channel estimates c(τ) to produce hypothesized received signal samples. The hypothesized received signal samples are subtracted from the actual received signal samples in summing junction 1102 to produce complex error signals. The real filter 1108 only passes the real part (in-phase component) of the complex error signals, and the image filter 1106 only passes the imaginary part (quadrature component) of the complex error signals. The real part of the error signal is squared in block 1110 then multiplied by multiplier $m_{II}$ in block 1132, the result being coupled to summing junction 1116. Similarly, the imaginary part of the error signal is squared in block 1118 then multiplied by multiplier $m_{QQ}$ in block 1114, the result being coupled to summing junction 1116. Also, the real and imaginary parts of the error signal are multiplied together in block 1134, multiplied by multiplier $m_{IQ}$ in block 1112, then coupled to summing junction 1116. The output of summing junction 1116 is the branch metric $M_h(n)$.

Figure 12:
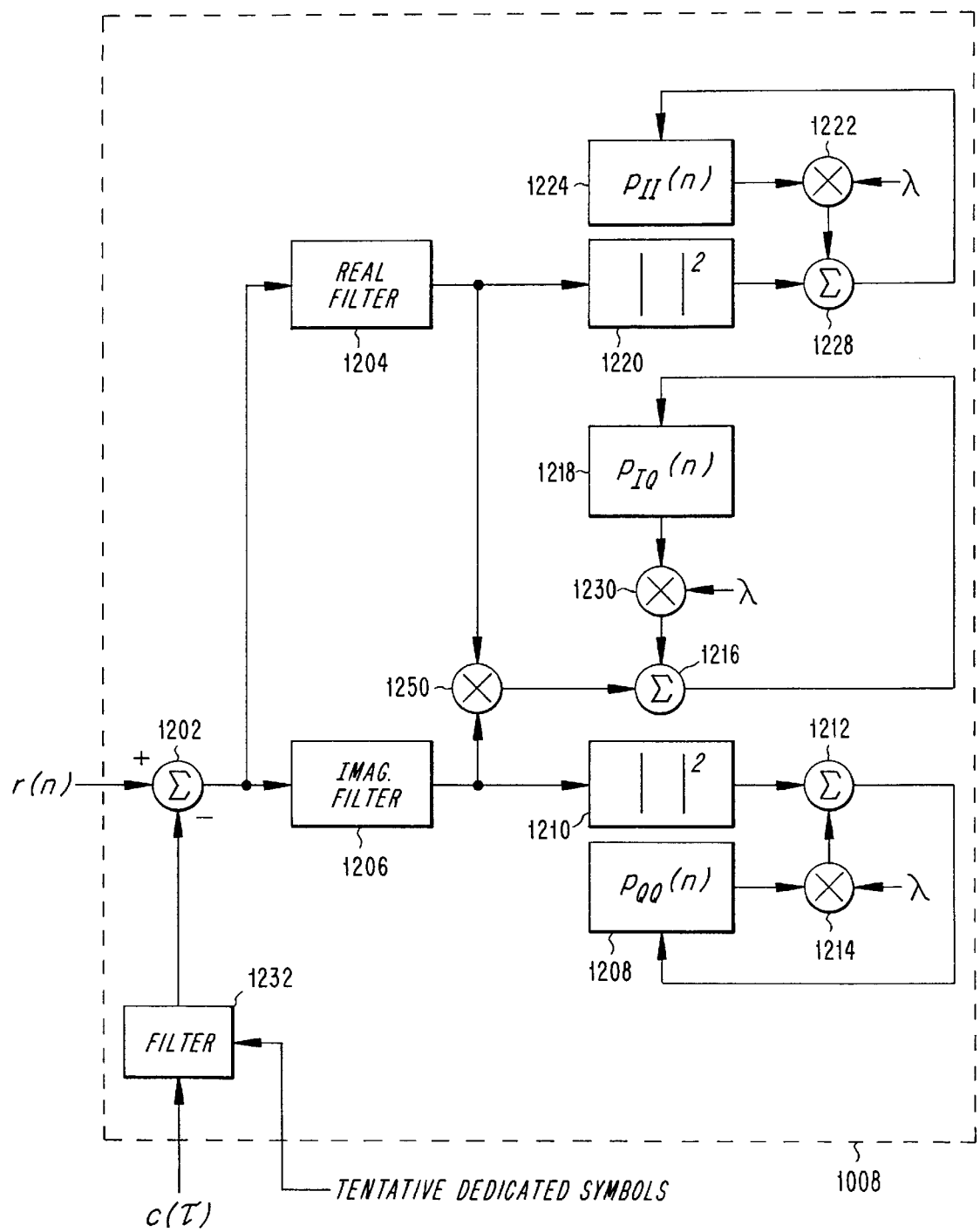
FIG. 12 is an exemplary illustration of a scalar correlation estimator according to the present invention.

A specific embodiment of the scalar impairment correlation estimator is illustrated in FIG. 12. Known or tentatively detected symbol values from sequence estimating processor 1010 are filtered by filter 1232 using channel tap estimates c(τ) from channel tap estimator 1004 to produce estimated received samples. Impairment samples are produced by subtracting estimated received samples from actual received samples in summing junction 1202. The real filter 1204 only passes the real parts (in-phase components) of the impairment samples, and the image filter 1206 only passes the imaginary parts (quadrature components) of the impairment samples. The in-phase components of the impairment samples are squared in block 1220 and provided to summing junction 1228. Also, the in-phase impairment power estimate $p_{II}$, stored in memory 1224, is scaled in junction 1222 by scale factor λ and provided to summing junction 1228. The output of junction 1228 gives the updated power estimate, which is written into memory 1224. Similarly, the quadrature components of the impairment samples are squared in block 1210 and provided to summing junction 1212. Also, the quadrature impairment power estimate $p_{QQ}$, stored in memory 1208, is scaled in junction 1214 by scale factor and provided to summing junction 1212. The output of junction 1212 gives the updated power estimate, which is written into memory 1208. Finally, the in-phase and quadrature components of the impairment samples are multiplied together in block 1250 and provided to summing junction 1216. Also, the in-phase/quadrature cross-correlation estimate $p_{IQ}$, stored in memory 1218, is scaled in junction 1230 by scale factor λ and provided to summing junction 1216. The output of junction 1216 gives the updated cross-correlation estimate, which is written into memory 1218.

Per-Survivor processing techniques can be used to improve performance. For example, there can be one or more sets of channel tap estimates and impairment correlation estimates per state in the sequence estimation processor. This allows immediate updating of estimates, without the need for a decision delay to obtain reliable tentatively detected symbols.

Also, all of the techniques discussed in section B (above) can be employed here to cull out a number of N signals from a larger number of M signals prior to performing interference rejection combining using a scalar branch matrix processor.

It will be known to those skilled in the art how the present invention can be used in conjunction with fractionally-spaced equalization as well as in conjunction with nonadaptive scenarios.

D. Description of Embodiment Employing Hybrid Combining

According to the following embodiment of the present invention, interference rejection is applied to sets of signals. The resulting metrics are then simply added together, with a possible weighting prior to adding. This trades performance for a reduction in complexity. The selection criteria can be adaptive, based on impairment correlation measurements, signal strength measurements, or other criteria. Also, the selection may be fixed.

Figure 13:
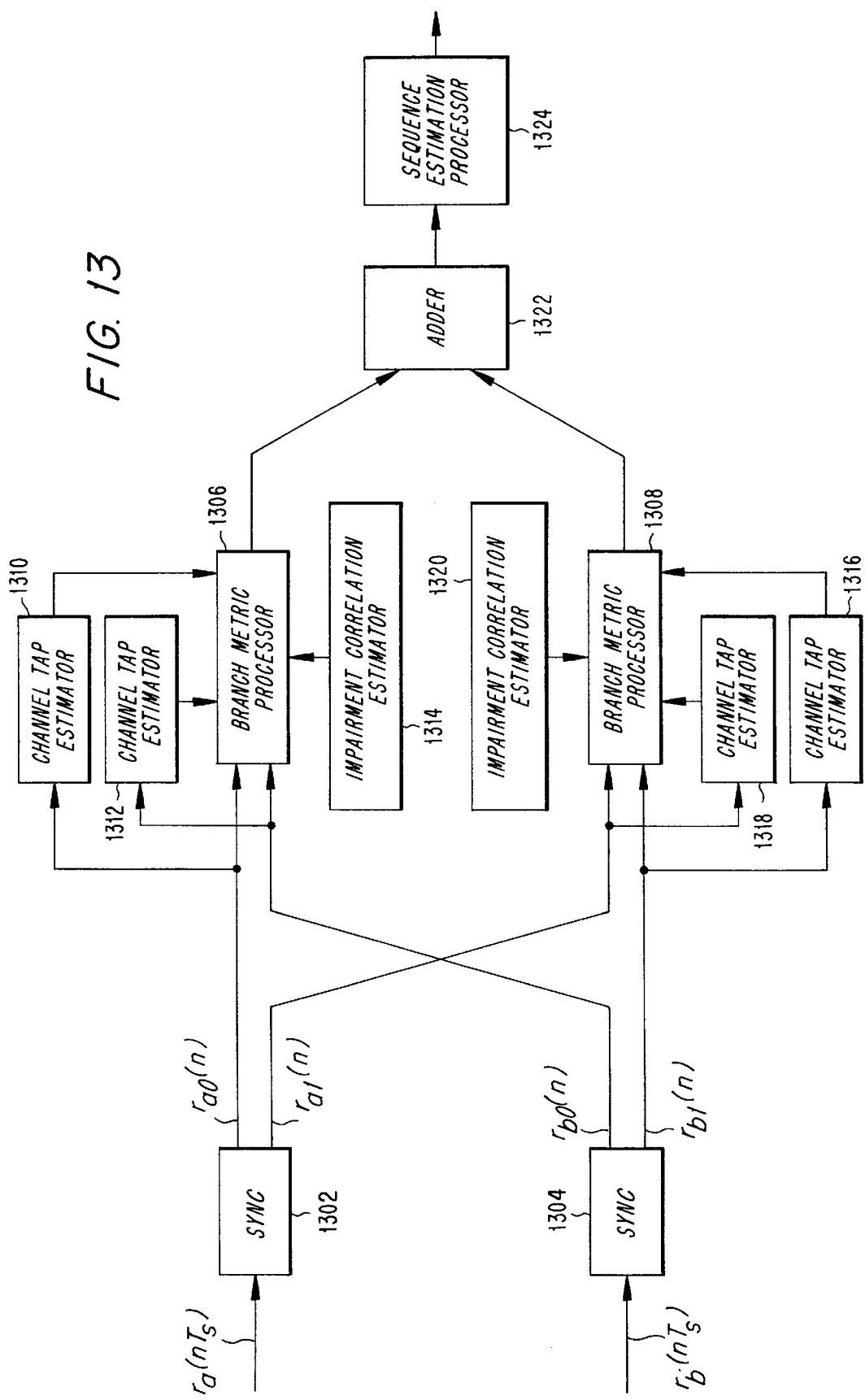
FIG. 13 is an exemplary illustration of an embodiment employing a plurality of branch metric processors.

FIG. 13 is an embodiment of processor 107 from FIG. 1, where 2 antennas and fractionally-spaced sampling by a factor of 2 are used. Thus, for each antenna, two symbol-spaced data sequences are formed, corresponding to two sampling phases. Sync blocks 1302 and 1304 take the oversampled signal streams from antennas a and b and produce two symbol-spaced sample streams each. Denoting the antennas with subscripts a and b and the sampling phases with subscripts 0 and 1, the four resulting received signal sample sequences are denoted $r_{a0}(n)$, $r_{a1}(n)$, $r_{b0}(n)$ and $r_{b1}(n)$. The embodiment uses a fixed selection criteria, so that interference rejection is applied to the pair $\{r_{a0}(n), r_{b0}(n)\}$ and the pair $\{r_{a1}(n), r_{b1}(n)\}$.

So, received signal sample streams $r_{a0}(n)$ and $r_{b0}(n)$ are provided to branch metric processor 1306. Also provided to branch metric processor 1306 are channel tap estimates corresponding to streams $r_{a0}(n)$ and $r_{b0}(n)$, which are computed in channel tap estimators 1310 and 1312. Impairment correlation estimates corresponding to streams $r_{a0}(n)$ and $r_{b0}(n)$ are provided by impairment correlation estimator 1314.

Similarly, received signal sample streams $r_{a1}(n)$ and $r_{b1}(n)$ are provided to branch metric processor 1308. Also provided to branch metric processor 1308 are channel tap estimates corresponding to streams $r_{a1}(n)$ and $r_{b1}(n)$, which are computed in channel tap estimators 1316 and 1318. Impairment correlation estimates corresponding to streams $r_{a1}(n)$ and $r_{b1}(n)$ are provided by impairment correlation estimator 1320.

The branch metrics from branch metric processors 1306 and 1308 are summed in added 1322, which produces a combined branch metric. The combined branch metric is then provided to sequence estimation processor 1324, which develops tentative and final estimates of the transmitted symbol sequence.

Although exemplary embodiments of the present invention have been described and illustrated herein to facilitate understanding of the present invention, it should be understood that the present invention is not limited thereto since modifications may be made by persons skilled in the art. The present application contemplates any and all such modifications that fall within the scope of the underlying invention disclosed and claimed herein.

What is claimed is:

1. A method for reducing the effects of signal fading, time dispersion, and interference in a radio communications system, comprising the steps of:
   (a) receiving a radio signal on at least one antenna element representing a transmitted symbol sequence;
   (b) processing said radio signal to produce received signal samples for said at least one antenna;
   (c) estimating a channel tap for said at least one antenna to a produce a channel tap estimate;
   (d) estimating scalar impairment correlation properties among the received signal samples to produce an estimate of scalar impairment correlation properties;
   (e) forming scalar branch metrics in a scalar branch metric processor using said received signal samples, said channel tap estimate, and said scalar estimate of impairment correlation properties; and
   (f) employing said scalar branch metrics in a sequence estimation algorithm to estimate said transmitted symbol sequence.

2. A method according to claim 1, in which said forming step (e) comprises:
   (g) generating hypothetical symbol sequences;
   (h) filtering said hypothetical signal sequences with said channel tap estimate to produce hypothesized received signal samples for said at least one antenna;
   (i) subtracting said hypothesized received signal samples from the received signal samples to produce complex error signals; and
   (j) processing said complex error signals with said scalar estimate of impairment correlation properties to produce branch metrics.

3. A method according to claim 2, in which said forming step (j) further comprises:
   (k) extracting an in-phase phase component from said complex error signal, and extracting a quadrature component from said complex error signal;
   (l) processing said in-phase component and said quadrature component to produce said branch metrics.

4. A method according to claim 1, in which said estimating step (d) comprises:
   (g) generating tentative detected symbol sequences;
   (h) filtering said tentative detected symbol sequences with said scalar channel tap estimate to produce estimated received signal samples for said at least one antenna;
   (i) subtracting said estimated received signal samples from the received signal samples to produce impairment signal samples; and
   (j) processing said impairment signal samples with said estimate of scalar impairment correlation properties to produce an updated estimate of said scalar impairment correlation properties.

5. A method according to claim 4, in which said forming step (j) further comprises:
   (k) extracting an in-phase phase component from said impairment signal samples, and extracting a quadrature component of said impairment signal samples;
   (l) processing said in-phase component and said quadrature component to produce said updated estimate of said scalar correlation properties.

6. An apparatus for reducing the effects of signal fading, time dispersion, and interference in a radio communications system, comprising:
   means for receiving a radio signal on at least one antenna element representing a transmitted symbol sequence;
   means for processing said radio signal to produce received signal samples for said at least one antenna;
   means for estimating a channel tap for said at least one antenna to a produce a channel tap estimate;
   means for estimating scalar impairment correlation properties among said radio signal samples to produce an estimate of scalar impairment correlation properties;
   means for forming scalar branch metrics in a scalar branch metric processor using said received signal samples, said channel tap estimates, and said scalar estimate of impairment correlation properties; and
   means for employing said scalar branch metrics in a sequence estimation algorithm to estimate said transmitted symbol sequence.

7. An apparatus according to claim 6, in which said means for forming scalar branch matrices comprises:
   means for generating hypothetical symbol sequences;
   means for filtering said hypothetical signal sequences with said channel tap estimate to produce hypothesized received signal samples for said at least one antenna;
   means for subtracting said hypothesized received signal samples from the received signal samples to produce complex error signals; and
   means for processing said complex error signals with said scalar estimate of impairment correlation properties to produce branch metrics.

8. An apparatus according to claim 7, in which said forming means for processing said complex error signals further comprises:
   means for extracting an in-phase phase component from said complex error signal, and extracting a quadrature component from said complex error signal;
   means for processing said in-phase component and said quadrature component to produce said branch metrics.

9. An apparatus according to claim 6, in which said means for estimating scalar impairment correlation properties comprises:
   means for generating tentative detected symbol sequences;
   means for filtering said tentative detected symbol sequences with said scalar channel tap estimate to produce estimated received signal samples for said at least one antenna;
   means for subtracting said estimated received signal samples from the received signal samples to produce impairment signal samples; and
   means for processing said impairment signal samples with said estimate of scalar impairment correlation properties to produce an updated estimate of said scalar impairment correlation properties.

10. An apparatus according to claim 9, in which said means for processing said impairment signal samples further comprises:
    means for extracting an in-phase phase component from said impairment signal samples, and extracting a quadrature component from said impairment signal samples;
    means for processing said in-phase component and said quadrature component to produce said updated estimate of said scalar correlation properties.

11. A method for reducing degradation in a transmitted signal sequence comprising the step of:
    (a) providing a number of radio signals representing said transmitted signal sequence;

(b) selecting a second number of signals from said number of radio signals using a selection processor on the basis of one or more selection criterion, where said second number is less than said first number;

(c) processing said second number of signals to generate an estimate of said transmitted signal sequence;

wherein said step (c) further comprises the steps of:

(d) receiving said second number of signals from said selection processor;

(e) processing said second number of signals to produce received signal samples;

(f) estimating channel taps for said signals to produce channel tap estimates;

(g) estimating impairment correlation properties among said received signals to produce an estimate of impairment correlation properties;

(h) forming branch metrics in a branch metric processor using said received signal samples, said channel tap estimates, and said estimate of impairment correlation properties; and (i) employing said scalar branch metrics in a sequence estimation algorithm to estimate said transmitted symbol sequence.

12. The method of claim 11, wherein step (a) further comprises:

(d) receiving radio signals from a plurality of co-phased antenna elements;

(e) processing said radio signals received from said antenna elements using a fixed beamforming processor to produce said first number of radio signals.

13. The method of claim 12, wherein said antenna elements include at least one element from each of two orthogonal polarizations.

14. The method of claim 11, wherein step (a) further comprises:

(d) receiving radio signals from a plurality of antenna elements, wherein said antenna elements form a plurality of groupings of antenna elements;

(e) processing said radio signals received from said antenna elements using a plurality of beamforming processors, wherein each beamforming processor is associated with one of said groupings of antenna elements, to produce said first number of radio signals.

15. The method of claim 14, wherein a collection of antenna elements having a first polarization form a first grouping, and a collection of antenna elements having a second polarization form a second grouping, further wherein said first polarization is orthogonal to said second polarization.

16. The method of claim 14, wherein a first collection of spatially associated antenna elements form a first grouping, and a second collection of spatially associated antenna elements form a second grouping.

17. The method of claim 11, wherein step (a) further comprises:

(d) receiving radio signals from at least one sector antenna.

18. The method of claim 11, wherein said criterion is one or more criterion from the following group of criteria: instantaneous power of a signal; average power of a signal; beam center direction relative to a desired signal direction; and signal quality as measured from a sync word.

19. The method of claim 11, wherein said step (b) is constrained to select at least one signal having a first polarization, and at least one signal having a second polarization, wherein the first polarization is orthogonal to said second polarization.

20. The method of claim 11, wherein:

step (h) comprises estimating scalar impairment correlation properties among said received signals to produce an estimate of scalar impairment correlation properties;

step (h) comprises forming scalar branch metrics in a scalar branch metric processor using said received signal samples, said channel tap estimates, and said estimate of scalar impairment correlation properties; and step (i) comprises employing said scalar branch metrics in said sequence estimation algorithm to estimate said transmitted symbol sequence.

21. An apparatus for reducing degradation in a transmitted signal sequence comprising:

(a) means for providing a first number of radio signals representing said transmitted signal sequence;

(b) means for selecting a second number of signals from said first number of radio signals using a selection processor on the basis of one or more selection criterion, where said second number is less than said first number;

(c) means for processing said second number of signals to generate an estimate of said transmitted signal sequences;

wherein said means for processing further comprises:

means for receiving said second number of signals from said selection processor;

means for processing said second number of signals to produce received signal samples;

means for estimating channel taps for said signals to produce channel tap estimates;

means for estimating impairment correlation properties among said received signals to produce an estimate of impairment correlation properties;

means for forming branch metrics in a branch metric processor using said received signal samples, said channel tap estimates, and said estimate of impairment correlation properties; and means for employing said scalar branch metrics in a sequence estimation algorithm to estimate said transmitted symbol sequence.

22. The apparatus of claim 21, wherein said means for receiving further comprises:

means for receiving radio signals from a plurality of co-phased antenna elements;

means processing said radio signals from said antenna elements using a fixed beamforming processor to produce said first number of radio signals.

23. The apparatus of claim 22, wherein said antenna elements include at least one element from each of two orthogonal polarizations.

24. The apparatus of claim 21, wherein said means for receiving further comprises:

a plurality of antenna elements for receiving signals, wherein said antenna elements form a plurality of groupings of antenna elements;

a plurality of beamforming processors, each beamforming processor associated with one of said groupings of antenna elements, said beamforming processors producing said first number of signals.

25. The apparatus of claim 24, wherein a collection of antenna elements having a first polarization form a first grouping, and a collection of antenna elements having a second polarization form a second grouping, further wherein said first polarization is orthogonal to said second polarization.

26. The apparatus of claim 24, wherein a first collection of spatially associated antenna elements form a first grouping, and a second collection of spatially associated antenna elements form a second grouping.

27. The apparatus of claim 21, wherein means for receiving further comprises:
   means for receiving radio signals from at least one sector antenna.

28. The apparatus of claim 21, wherein said criterion is one or more criterion from the following group of criteria: instantaneous power of a signal; average power of a signal; beam center direction relative to a desired signal direction; and signal quality as measured from a sync word.

29. The apparatus of claim 21, wherein said means for selecting is constrained to select at least one signal having a first polarization and at least one signal a second polarization, wherein said first polarization is orthogonal to said second polarization.

30. The apparatus of claim 21, wherein:
   said means for estimating estimates scalar impairment correlation properties among said received signals to produce an estimate of scalar impairment correlation properties;
   said means for forming forms scalar branch metrics in a scalar branch metric processor using said received signal samples, said channel tap estimates, and said estimate of scalar impairment correlation properties; and
   said means for employing employs said scalar branch metrics in said sequence estimation algorithm to estimate said transmitted symbol sequence.

31. The method of claim 11, wherein:
   step (a) comprises receiving said first number of signals representing said transmitted signal sequence from a corresponding first number of antenna elements, wherein said first number of antenna elements include at least one element having a first polarization, and at least one other antenna element having a second polarization.

32. The method of claim 31, wherein said first and second polarizations are orthogonal to each other.

33. The method of claim 32, wherein said orthogonal first and second polarizations are: i) horizontal and vertical polarizations, respectively; ii) plus and minus 45 degree polarizations, respectively; or iii) right and left circular polarizations, respectively.

34. The apparatus of claim 21, further comprising:
   a first number of antenna elements for receiving said first number of radio signals representing said transmitted signal sequence, wherein said first number of antenna elements includes at least one element having a first polarization, and at least one other antenna element having a second polarization.

35. The apparatus of claim 34, wherein said first and second polarizations are orthogonal to each other.

36. The apparatus of claim 35, wherein said orthogonal first and second polarizations are: i) horizontal and vertical polarizations, respectively; ii) plus and minus 45 degree polarizations, respectively; or iii) right and left circular polarizations, respectively.

37. A method for reducing the effects of signal fading, time dispersion, and interference in a radio communications system, comprising the steps of:

(a) receiving a signal representing a transmitted symbol sequence on plural antenna elements;

(b) processing said signal to produce received signal samples for each of said plural antenna elements;

(c) estimating channel taps for said plural antenna elements to a produce channel tap estimates;

(d) estimating impairment correlation properties among said received signals to produce an estimate of impairment correlation properties;

(e) forming branch metrics in a branch metric processor using said received signal samples, said channel tap estimates, and said estimate of impairment correlation properties; and (f) employing said branch metrics in a sequence estimation algorithm to estimate said transmitted symbol sequence, wherein said plural antenna elements include at least a first element producing a first polarization, and a second element producing a second polarization.

38. The method of claim 37, wherein said processing step (b) includes processing said radio signal using at least one fixed beamforming processor.

39. An apparatus for reducing the effects of signal fading, time dispersion, and interference in a radio communications system, comprising:
   plural antenna elements for receiving a signal representing a transmitted symbol sequence;
   processing logic for processing said signal to produce received signal samples for each said plural antenna elements;
   a first estimator for estimating channel taps for said plural antenna elements to a produce channel tap estimates;
   a second estimator for estimating impairment correlation properties among said received signals to produce an estimate of impairment correlation properties;
   a branch metric processor for forming branch metrics using said received signal samples, said channel tap estimates, and said estimate of impairment correlation properties; and
   logic for employing said branch metrics in a sequence estimation algorithm to estimate said transmitted symbol sequence,
   wherein said plural antenna elements include at least a first element producing a first polarization, and a second element producing a second polarization.

40. The apparatus method of claim 39, wherein said processing logic employs at least one fixed beamforming processor.

41. In a digital communications system for transmitting a sequence of digital symbols, a method for reducing the effects of signal fading, time dispersion, and interference in a radio communications system, comprising the steps of:

(a) receiving a number of radio signals;

(b) selecting groups of radio signals using a selection processor;

(c) processing each group of radio signals to produce branch metrics;

(d) adding said branch metrics from different groups to produce combined branch metrics; and (e) employing said combined branch metrics in a sequence estimation algorithm to estimate said transmitted symbol sequence.

42. The method according to claim 41, in which processing step (c) is applied to each of said groups of radio signals, and further comprises, for each of said groups, the steps of:

(f) receiving a group of radio signals from said selection processor;

(g) processing said group of signals to produce received signal samples;

(h) estimating channel taps for said group of signals to produce channel tap estimates;

(i) estimating impairment correlation properties among the signals within the group to produce an estimate of impairment correlation properties;

(j) forming branch metrics in a branch metric processor using said received signal samples, said channel tap estimates, and said estimate of impairment correlation properties.

43. An apparatus for reducing the effects of signal fading, time dispersion, and interference in a radio communications system, comprising:

means for receiving a number of radio signals representing a transmitted sequence of symbols;

means for selecting groups of radio signals using a selection processor;

a plurality of processing means, each for processing a respective group of radio signals, to produce branch metrics;

means for adding said branch metrics from different groups to produce combined branch metrics; and means for employing said combined branch metrics in a sequence estimation algorithm to estimate said transmitted symbol sequence.

44. The apparatus according to claim 43, in which each one of said plurality of processing means comprises:

means for receiving said group of radio signals to produce received signal samples;

means for processing said group of signals to produce received signal samples;

means for estimating channel taps for said group of signals to produce channel tap estimates;

means for estimating impairment correlation properties among the signals within the group to produce an estimate of impairment correlation properties; and means for forming branch metrics in a branch metrics processor using said received signals samples, said channel tap estimates, and said estimate of impairment correlation properties.

45. A method for reducing degradation in a transmitted signal sequence comprising the step of:

(a) receiving a number of radio signals from a plurality of antenna elements, a first group of said antenna elements using a first polarization and a second group of said antenna elements using a second polarization;

(b) processing said radio signals in at least one beamforming processor to produce a first number of radio signals;

(c) selecting a second number of radio signals from said first number of radio signals using a selection processor on the basis of one or more selection criterion, where said second number is less than said first number, and said second number is greater than 1; and (d) processing said second number of signals to generate an estimate of said transmitted signal sequence using a sequence estimation algorithm employing branch metrics;

wherein said step (c) is constrained to select at least one signal having a first polarization, and at least one signal having a second polarization, wherein the first polarization is orthogonal to said second polarization.

46. The method of claim 45, wherein said criterion is one or more criterion from the following group of criteria: instantaneous power of a signal; average power of a signal; beam center direction relative to a desired signal direction; and signal quality as measured from a sync word.

47. An apparatus for reducing degradation in a transmitted signal sequence comprising:

a plurality of antenna elements for receiving a number of radio signals, a first group of said antenna elements using a first polarization and a second group of said antenna elements using a second polarization;

at least one beamformer for processing said radio signals to produce a first number of radio signals;

a selector for selecting a second number of radio signals from said first number of radio signals using a selection processor on the basis of one or more selection criterion, where said second number is less than said first number, and said second number is greater than 1; and a processor for processing said second number of signals to generate an estimate of said transmitted signal sequence using a sequence estimation algorithm employing branch metrics;

wherein said selector is constrained to select at least one signal having a first polarization, and at least one signal having a second polarization, wherein the first polarization is orthogonal to said second polarization.

48. The apparatus of claim 47, wherein said criterion is one or more criterion from the following group of criteria: instantaneous power of a signal; average power of a signal; beam center direction relative to a desired signal direction; and signal quality as measured from a sync word.

* * * * *

UNITED STATES PATENT AND TRADEMARK OFFICE
CERTIFICATE OF CORRECTION

PATENT NO. : 6,081,566
DATED : June 27, 2000
INVENTOR(S) : Molnar et al.

Page 1 of 1

It is certified that error appears in the above-identified patent and that said Letters Patent is hereby corrected as shown below:

<u>Column 19, Line 22, and Column 20, Line 43,</u>
Delete scalar.

Signed and Sealed this

Twenty-eighth Day of August, 2001

Attest:

*Nicholas P. Godici*

NICHOLAS P. GODICI
*Attesting Officer*   *Acting Director of the United States Patent and Trademark Office*